US007876259B2

(12) United States Patent
Schuchman

(10) Patent No.: US 7,876,259 B2
(45) Date of Patent: Jan. 25, 2011

(54) AUTOMATIC DEPENDENT SURVEILLANCE SYSTEM SECURE ADS-S

(76) Inventor: Leonard Schuchman, 11054 Seven Hill La., Potomac, MD (US) 20854

( * ) Notice: Subject to any disclaimer, the term of this patent is extended or adjusted under 35 U.S.C. 154(b) by 357 days.

(21) Appl. No.: 11/979,363

(22) Filed: Nov. 1, 2007

(65) Prior Publication Data

US 2008/0266166 A1 Oct. 30, 2008

Related U.S. Application Data

(60) Provisional application No. 60/856,830, filed on Nov. 6, 2006, provisional application No. 60/902,867, filed on Feb. 23, 2007.

(51) Int. Cl.

| | |
|---|---|
| ***G01S 13/74*** | (2006.01) |
| ***G01S 13/91*** | (2006.01) |
| *G01S 13/00* | (2006.01) |
| *G01S 13/93* | (2006.01) |

(52) U.S. Cl. .............................. 342/37; 342/36; 701/1; 701/3; 701/120; 701/200; 701/207; 701/213; 380/255; 380/287

(58) Field of Classification Search ............. 342/29–51, 342/175, 195; 701/1, 3–18, 120–122, 200, 701/207, 213–216, 300, 301; 709/246; 713/150, 713/168; 380/255, 28–30, 287, 59, 277, 380/44–47

See application file for complete search history.

(56) References Cited

U.S. PATENT DOCUMENTS

| | | | | |
|---|---|---|---|---|
| 6,529,820 | B2 * | 3/2003 | Tomescu | 701/120 |
| 6,760,778 | B1 * | 7/2004 | Nelson et al. | 709/246 |
| 6,789,016 | B2 * | 9/2004 | Bayh et al. | 342/30 |
| 2002/0147542 | A1 * | 10/2002 | Tomescu | 701/120 |
| 2004/0086121 | A1 * | 5/2004 | Viggiano et al. | 380/255 |
| 2007/0239986 | A1 * | 10/2007 | Viggiano et al. | 713/168 |

* cited by examiner

*Primary Examiner*—Bernarr E Gregory
(74) *Attorney, Agent, or Firm*—Bacon & Thomas, PLLC

(57) ABSTRACT

An air traffic control automatic dependent, WAAS/GPS based, surveillance system (ADS), for operation in the TRACON airspace. The system provides encryption protection against unauthorized reading of ADS messages and unauthorized position tracking of aircraft using multilateration techniques. Each aircraft has its own encryption and long PN codes per TRACON and transmit power is controlled to protect against unauthorized ranging on the ADS-S aircraft transmission. The encryption and PN codes can be changed dynamically. Several options which account for available bandwidth, burst data rates, frequency spectrum allocations, relative cost to implement, complexity of operation, degree of protection against unauthorized users, system capacity, bits per aircraft reply message and mutual interference avoidance techniques between ADS-S, ADS-B Enroute and Mode S/ATCRBS TRACON are disclosed. ADS messages are only transmitted as replies to ATC ground terminal interrogations (no squittering). Derivative surveillance backup systems provide an anti-spoofing capability.

26 Claims, 43 Drawing Sheets

FIG. 3

TRACON Estimate of Max Aircraft in TRACON (15 minute interval)

DATA obtained from FAA ATCSCCC OIS Web page dated 9/20/2007

| Eastern Directory | | | | | | Western Directory | | | | | |
|---|---|---|---|---|---|---|---|---|---|---|---|
| | Max arrival Rate/hour Max) (VFR,VAPS) | **MAX A/C in TRACON 15 interval** | | Max arrival Rate/hour Max) (VFR,VAPS) | **MAX A/C in TRACON 15 interval** | | Max arrival Rate/hour Max) (VFR,VAPS) | **MAX A/C in TRACON 15 interval** | | Max arrival Rate/hour Max) (VFR,VAPS) | **MAX A/C in TRACON 15 interval** |
| **ZWB** | | | **ZNY** | | | **ZAB** | | | **ZLA** | | |
| BDL | 39 | 29 | EWR | 58 | 44 | ABQ | 64 | 48 | BUR | 42 | 32 |
| BOS | 67 | 50 | HPN | 65 | 49 | PHQ | 76 | 57 | LAS | 64 | 48 |
| MHT | 29 | 22 | ISP | 32 | 24 | **ZAU** | | | LAX | 92 | 69 |
| PVD | 27 | 20 | JFK | 68 | 51 | MDW | 36 | 27 | LGB | 32 | 24 |
| **ZDC** | | | LGA | 44 | 33 | MKE | 57 | 43 | ONT | 50 | 38 |
| ADW | | | PHL | 51 | 38 | ORD | 100 | 75 | PSP | 24 | 18 |
| BWI | 54 | 41 | SWF | 0 | 0 | **ZDV** | | | SAN | 27 | 20 |
| DCA | 55 | | TEB | 0 | 0 | DEN | 160 | 120 | SNA | 27 | 20 |
| IAD | 90 | | **ZOB** | | | **ZFW** | | | **ZLC** | | |
| RDU | 60 | | BUF | 36 | 27 | DAL | 40 | 30 | SLC | 84 | 63 |
| **ZID** | | | CLE | 32 | 24 | DFW | 150 | 113 | **ZME** | | |
| CVG | 108 | 81 | DTW | 119 | 89 | **ZFU** | | | BNA | 74 | 56 |
| IND | 90 | | PIT | 90 | 68 | HNL | 54 | 41 | MEM | 92 | |
| SDF | 30 | | ROC | 0 | 0 | **ZHU** | | | **ZMP** | | |
| **ZJX** | | | **ZTL** | | | IAH | | | MSP | 80 | 60 |
| JAX | 68 | 51 | ATL | 96 | 72 | HOU | 90 | 68 | **ZOA** | | |
| MCO | 0 | | BHM | 50 | 38 | MSY | 45 | 34 | OAK | 58 | 44 |
| TPA | 70 | | CLT | 75 | 56 | SUN | 80 | 60 | SFO | 60 | 45 |
| **ZMA** | | | | | | **ZKC** | | | SJC | 35 | 26 |
| FLL | 46 | 35 | | | | MCI | 64 | 48 | **ZSE** | | |
| MIA | 80 | 60 | | | | OMA | 36 | 27 | PDX | 60 | 45 |
| PBI | 36 | 27 | | | | STL | 52 | 39 | SEA | 44 | 33 |
| RSW | 30 | 23 | | | | | | | | | |

Estimated from MAX arrival rate per hour

Ground/Air Link Budget for A/C 50 miles from TRACON Terminal

| Data Budget | | | |
|---|---|---|---|
| λ m | | 0.29 | |
| Transmit Power Watts | 400 | 26.02 | dBW |
| Tx Antenna Gain | | 3.00 | dBW |
| Path Loss (Distance in Km 80.5) 50nm | | 134.90 | dB |
| Margins include receiver losses multipath,etc. | | 12.00 | dB |
| Rx Antenna Gain | | 3.00 | dB |
| Received Signal Power | | -114.88 | dBW |
| Noise power density | | -200.00 | dBW/Hz |
| C/No | | 85.12 | dB-Hz |
| Integration Time | | 66.00 | dB |
| 2 bits per .25us | | -3.00 | dB |
| Eb/No | | 16.12 | dB |
| Eb/No Required | | 10.00 | dB |
| Margins | | 6.12 | dB |

This has been designed as a robust link

FIG. 4

Acquisition Search Window

| Acquisition Search Window | | |
|---|---|---|
| | | |
| | μs | |
| Clock variations | 1 | WAAS/GPS driven clocks Transmit & Receive |
| | | Clock accuracy in nanoseconds |
| Transponder delay | 10.5 | 3.1μs to 3.5μs trial measurements |
| | | European Modes Station |
| | | Functional Specification 5/9/05 |
| | | Section H2.5 (q) |
| Δ range uncertainty | 6 | 500 ft/s =300m/hr |
| | | assume worst case 12s update rate |
| | | for transition from Enroute to TRACON |
| | | 6000ft uncertainty |
| misc. | 2.5 | |
| | | |
| Total | 20 | uncertainty window is 2 chips of PN code |

FIG. 5

Worst Case Doppler

| Doppler | | | |
|---|---|---|---|
| Aircraft Velocity | Speed of Light C | Frequency | Doppler |
| ft/s | ft/ns | GHz | Hz |
| 500 | 1 | 1.09 | 545 |

FIG. 6

Number of Parallel Correlation Sets Needed to Acquire PN Code

| Number of parallel correlation sets to acquire one code | | |
|---|---|---|
| Correlation sets per chip uncertainty | 4 | 4 |
| Added sets for 1/2 chip resolution | 4 | 4 |
| Sub Total | 8 | 8 |
| Reducing Doppler code acquisition loss to 1dB By creating 10 IF filters per chip search 10X8 | | |
| Total parallel correlation sets per code being acquired | | 80 |

FIG. 7

Acquisition 9ms Budget

| Aquistion | | | |
|---|---|---|---|
| λ | m | 0.28 | |
| Transmit Power Watts | 0.00156 | -28.07 | dBW |
| Tx Antenna Gain | | 3.00 | dBW |
| Path Loss (Distance in Km 80.6) 50.08m | | 131.38 | dB |
| Enviornmentasl losses | | 3.00 | dB |
| cable connector | | 2.00 | dB |
| Rx Antenna Gain | | 11.02 | dB |
| Received Signal Power | | -150.43 | dBW |
| Noise power density | | -200.00 | dBW/Hz |
| C/No | | 49.57 | dB-Hz |
| Integration Time (11bit Barker sequence) | s 0.011 | -19.59 | dB |
| Doppler Filter Widening Degradation 3090/2000=1.545 | | 1.90 | dB |
| Eb/No | | 28.09 | dB |

FIG. 8

The Improvement in the Probability of Detection Using the 3 out of 5 Decision Rule

| Pd | Pnd | PD |
|---|---|---|
| 0.7 | 0.3 | 0.837 |
| 0.8 | 0.2 | 0.942 |
| 0.85 | 0.15 | 0.973 |
| 0.9 | 0.1 | 0.991 |
| 0.95 | 0.05 | 0.999 |

FIG. 9

Air/Ground Link Budget for A/C 50 miles from Com Terminal
1Kbps Data Burst Rate-150bits per 1/4s

| Data Budget | | | |
|---|---|---|---|
| λ | m | | 0.28 |
| Transmit Power Watts | | 0.001525 | -28.17 |
| Tx Antenna Gain | | | 3.00 |
| Antenna Diameter Receive m | | | 0.42 |
| Path Loss (Distance in Km 80.6) 50.08m | | | 131.27 |
| Enviornmentasl losses | | | 3.00 |
| Recive Antenna Efficiency | | | 0.55 |
| cable connector & all common all MA users | | | 2.00 |
| Rx Antenna Gain | | | 11.02 |
| Received Signal Power | | | -150.42 |
| Noise power density | | | -200.00 |
| C/No | | | 49.58 |
| Integration Time | s | 0.001 | -30.00 |
| QPSK | | | -3.00 |
| Eb/No | | | 16.58 |
| Eb/No Required | | | 4.50 |
| Margin (Multi path, ant. blockage, power variation) | | | 12.08 |

FIG. 10

Implementation Options

Option Characteristics

| | | | | | TRACON | Enroute | Enroute | Enroute | |
|---|---|---|---|---|---|---|---|---|---|
| | Ground/Air | TRACON | TRACON Signal Security | | Air/Ground | Air/Ground | Signal | Signal | TRACON |
| | Frequency | Signal | | Multilateration | Frequency | Frequency | Structure | Security | Squitter |
| Option | MHz | Structure | Encryption | Protection | MHz | MHz | | | |
| | | | | | | | | | |
| A | 1030 | ADS-B | √ | | 1090 | 1090 | ADS-B | non | No |
| | | | | | | | | | |
| B | 1030 | ADS-S | √ | √ | 1090 | 1090 | ADS-B | non | No |
| | | | | | | | | | |
| C | 1030 | ADS-S | √ | √ | 990 | 1090 | ADS-B | non | No |
| | | | | | | | | | |

Within the Enroute airspace Aircraft squitter their ADS message

All options utilize the 1030MHz Ground/Air frequency

FIG. 11

Conceptual implementation of Decryption Code.

The Decryption Process

Option A
Encryption/Decryption Summary

| Encrypted Code Bits per cycle | Encrypted Error correcting bits | Bits per Sequence number | Encrypted Bits per cycle | Total Sequence Transmitted 2 Times per A/C | Number of sequences that need to be searched if code is not known |
|---|---|---|---|---|---|
| 72 | 48 | 7 | 840 | 3360 | >4.7trillion with probability 1-(1.2E-19) |
| 144 | 96 | 8 | 1920 | 3840 | > Computer capability |

FIG. 15

Option A Operational States For ADS-S Communications

ADS-S Option A

| 8 sectored antenna | | | 4 sectored antenna | | |
|---|---|---|---|---|---|
| Time Seconds | ADS-S State | ADS-S Option A Active Antenna Beams | Time Seconds | ADS-S State | ADS-S Option A Active Antenna Beams |
| 0.0-0.5 | 1 | N1,E1,S1 | 0.0-1.0 | W | E |
| 0.5-1.0 | 2 | N2,E2,S2 | 1.0-2.0 | N | S |
| 1.0-1.5 | 3 | E1,S1,W1 | 2.0-3.0 | E | W |
| 1.5-2.0 | 4 | E2,S2,W2 | 3.0-4.0 | S | N |
| 2.0-2.5 | 5 | S1,W1,N1 | | | |
| 2.5-3.0 | 6 | S2,W2,N2 | | | |
| 3.0-3.5 | 7 | W1,N1,E1 | | | |
| 3.5-4.0 | 8 | W2,N2,E2 | | | |

Options B & C
Encryption/Decryption Summary

| | | | | | 1.72.Mbps | |
|---|---|---|---|---|---|---|
| Encrypted Code Bits per cycle | Encrypted Error correcting bits | Bits per Sequence number | Encrypted Bits per cycle | Total Sequence Transmitted 2 Times per A/C | Number A/C Updated per second | Number of sequences that need to be searched if code is not known |
| 75 | 75 | 8 | 1200 | 4800 | 358.3 | >1.8 trillion with probability 1-(2.6E-28) |
| 150 | 150 | 9 | 2700 | 5400 | 318.5 | >Computer capability |

FIG. 18

Option B Operational States
For 1Kbps Burst Data Rate, 189Kcps PN code Rate

As demonstrated there is no interference within ADS-S and between ADS-S And ADS-B and Mode S/ATCRBS

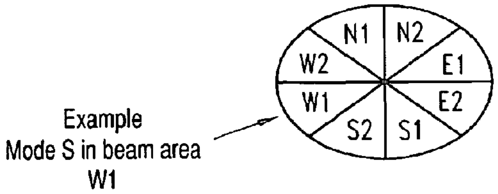

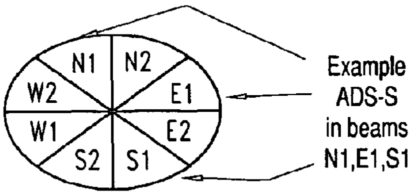

Mode S/ATCRBS States
Mode S/ATCRBS has a 4 second rotating 2° beam

ADS-S States
1 Transmit Beam & 3 simultaneous Receive Beams
Beams electronically Formed

| Option B<br>1KBps Burst Data Rate, 189Kcps PN code rate, 6MHz BW | | | | | |
|---|---|---|---|---|---|
| Time Seconds | ADS-S State | ADS-S Active Ant Beams | ADS-S Omni Antenna | Mode S/ATCRBS State Active Beam | Capacity 6MHz |
| 0.0-.25 | | | ADS-B | W1 | |
| .25-.5 | 1 | N1,E1,S1 | | W1 | 45 |
| .5-.75 | | | ADS-B | W2 | |
| .75-1 | 2 | N2,E2,S2 | | W2 | 45 |
| 1-1.25 | | | ADS-B | N1 | |
| 1.25-1.50 | 3 | E1,S1,W1 | | N1 | 45 |
| 1.50-1.75 | | | ADS-B | N2 | |
| 1.75-2.00 | 4 | E2,S2,W2 | | N2 | 45 |
| 2.00-2.25 | | | ADS-B | E1 | |
| 2.25-2.250 | 5 | S1,W1,N1 | | E1 | 45 |
| 2.50-2.75 | | | ADS-B | E2 | |
| 2.75-3.00 | 6 | S2,W2,N2 | | E2 | 45 |
| 3.00-3.25 | | | ADS-B | S1 | |
| 3.25-3.50 | 7 | W1,N1,E1 | | S1 | 45 |
| 3.50-3.75 | | | ADS-B | S2 | |
| 3.75-4.00 | 8 | W2,N2,E2 | | S2 | 45 |
| Max A/C 150 bit replies per 4 seconds Total | | | | | 360 |

FIG. 20

Option B One Ground Terminal PN Generator

Option B
Number of Weeks per Code Cycle
Using Eight 6 Bit Maximum length Code Shift Registers

| Number Bits per Code Cycle | Clock Rate | Number of Weeks per Code Cycle |
|---|---|---|
| | | |
| 2.48156E+14 | 189Kbps | 2170.954938 |
| | | |
| 2.48156E+14 | 18.9Mcps | 21.70954938 |

FIG. 23

Option B Aircraft Radio PN Generator

Aircraft Flight Model Within the TRACON

| Distance from TRACON airport runway | Aircraft altitude |
|---|---|
| miles | feet |
| 50 | 15,000 |
| 40 | 12,000 |
| 30 | 9,000 |
| 20 | 6,000 |
| 10 | 3,000 |

FIG. 26

Comparison of link Budgets for Aircraft Transmission With Saboteur Directly Under the Aircraft When Passing at 50 miles from the Terminal

| | | | | |
|---|---|---|---|---|
| TRACON Terminal istance from A/C | miles | | 50 | |
| Sabotuer Terminal distance from A/C | miles | | | 2.84 |
| λ | m | | 0.28 | 0.28 |
| Transmit Power Watts | | 0.001804 | -27.43763 | -27.44 |
| Tx Antenna Gain | | | 3.00 | 3.00 |
| Antenna Diameter Receive m | | | 0.86 | |
| Path Loss (Distance in Km 80.6) | 50.08m | | 131.31 | 106.40 |
| Enviornmentasl losses | | | 3.00 | 3.00 |
| Recive Antenna Efficiency | | | 0.55 | |
| cable connector & all common | all MA users | | 2.00 | 2.00 |
| Rx Antenna Gain | | | 9.00 | 3.00 |
| Received Signal Power | | | -151.75 | -132.84 |
| Noise power density | | | -200.00 | -200.00 |
| C/No | | | 48.25 | 67.16 |
| Integration Time | s | 0.001 | -30.00 | |
| QPSK | | | -3.00 | |
| Eb/No | | | 15.25 | |
| Eb/No Required | | | 4.50 | |
| Margin (Multi path, ant. blockage, power variation) | | | 10.75 | |
| Noise Power in PN Band Width dB | | | | -55.77492 |
| C/N as seen by Sabotuer Terminal @ 50m from TRACON dB | | | | 11.39 |
| Terminal directly below A/C as it passes overhead | | | | |

FIG. 27

Option B – PN Protection Against Saboteur as a Function of PN Rate and Antenna Gain

| .86m Diameter Phased Array Antenna | Option B | | 6MHz | | |
|---|---|---|---|---|---|
| Slant Range to A/C from TRACON Terminal | 50.08059 | 40.06447 | 30.04835 | 20.07246 | 10.14414 |
| Data Burst Rate (150bits per message) | 1Kbps | 1Kbps | 1Kbps | 1Kbps | 1Kbps |
| PN chip rate | 189Kcps | 189Kcps | 189Kcps | 189Kcps | 189Kcps |
| Numberof Beams per state | 3 | 3 | 3 | 3 | 3 |
| Number of beams | 8 | 8 | 8 | 8 | 8 |
| Number A/C messages within a beam per beam state | 15 | 15 | 15 | 15 | 15 |
| Number of states per cycle | 8 | 8 | 8 | 8 | 8 |
| Cycle time in seconds | 4 | 4 | 4 | 4 | 4 |
| Number of messages per beam per 4 seconds (average) | 45 | 45 | 45 | 45 | 45 |
| Total number Messages per 4 seconds | 360 | 360 | 360 | 360 | 360 |
| Number of antenna elements | ~30 | ~30 | ~30 | ~30 | ~30 |
| Beam Width | 45.84° | 45.84° | 45.84° | 45.84° | 45.84° |
| Eb/No Margin as seen at TRACON Terminal | 10.75 | 10.75 | 10.75 | 10.75 | 10.75 |
| C/N worst case as seen by terminal with A/C overhead | 11.4 | 11.4 | 11.4 | 11.4 | 11.4 |

| 1.72m Diameter Phased Array Antenna | Option B | | 6MHz | | |
|---|---|---|---|---|---|
| Slant Range to A/C from TRACON Terminal | 50.08059 | 40.06447 | 30.04835 | 20.07246 | 10.14414 |
| Data Burst Rate (150bits per message) | 1Kbps | 1Kbps | 1Kbps | 1Kbps | 1Kbps |
| PN chip rate | 756Kbps | 756Kbps | 756Kbps | 756Kbps | 756Kbps |
| Total Bandwidth | 6MHz | 6MHz | 6MHz | 6MHz | 6MHz |
| Numberof Beams per state | 14 | 14 | 14 | 14 | 14 |
| Number of beams | 32 | 32 | 32 | 32 | 32 |
| Number A/C messages within a beam per beam state | 3 | 3 | 3 | 3 | 3 |
| Number of states per cycle | 32 | 32 | 32 | 32 | 32 |
| Cycle time in seconds | 16 | 16 | 16 | 16 | 16 |
| Number of messages per beam per 4 seconds (average) | 28 | 28 | 28 | 28 | 28 |
| Total number Messages per 4 seconds | 336 | 336 | 336 | 336 | 336 |
| Number of antenna elements | ~60 | ~60 | ~60 | ~60 | ~60 |
| Beam Width | 11.74° | 11.74° | 11.74° | 11.74° | 11.74° |
| Eb/No Margin as seen at TRACON Terminal (dB) | 10.75 | 10.75 | 10.75 | 10.75 | 10.75 |
| C/N worst case as seen by terminal with A/C overhead (dB) | -0.6 | -0.6 | -0.6 | -0.6 | -0.6 |

FIG. 28

The Benefits of Option C Alternatives

| | Option C1 | Option C2 | Option C3 | Option C4 | Option C5 |
|---|---|---|---|---|---|
| Total Band Width MHz | 6 | 12 | 12 | 24 | 24 |
| Antenna Diameter | 1.72 | 1.72 | 1.72 | 1.72 | 0.86 |
| Data Burst Rate (150bits per message) | 0.5 | 0.5 | 0.5 | 0.5 | 0.5 |
| PN chip rate | 378 | 756 | 378 | 756 | 1512 |
| Numberof Beams per state | 14 | 14 | 14 | 14 | 3 |
| Number of beams | 32 | 32 | 32 | 32 | 8 |
| Number A/C messages within a beam per beam state | 7 | 7 | 15 | 15 | 15 |
| Number of states per cycle | 32 | 32 | 32 | 32 | 8 |
| Cycle time in seconds | 16 | 16 | 16 | 16 | 4 |
| Number of messages per beam per 4 seconds (average) | 24 | 24 | 105 | 52.5 | 28 |
| Total number Messages per 4 seconds | 784 | 784 | 1680 | 1680 | 360 |
| Number of antenna elements | ≈60 | ≈60 | ≈60 | ≈60 | ≈30 |
| C/N worst case as seen by terminal with A/C overhead dB | -1.25 | -4.25 | -1.25 | -4.25 | -1.25 |

FIG. 29

| | | | | |
|---|---|---|---|---|
| | | Air Terminal | | |
| | | Digital Signal Processor | | |
| | | Key Functions | | |
| **Receiver** | **ATCRBS** | **ADS-B** | **ADS-S** | **ADS-S** |
| | **Mode S** | | **Option A** | **Option B& C** |
| Filtering | √ | √ | √ | √ |
| Timing | √ | √ | √ | √ |
| Carieer Acquistion | √ | √ | √ | √ |
| Carrier Tracking | √ | √ | √ | √ |
| Symbol Sync | √ | √ | √ | √ |
| Data Demodulation | √ | √ | √ | √ |
| Data Decode | | | √ | √ |
| Decryption | | | √ | √ |
| Data distribution | √ | √ | √ | √ |
| State Change | √ | √ | √ | √ |
| | | | | |
| **Transmitter** | | | | |
| Data Reception | √ | √ | √ | √ |
| Data Formatting | √ | √ | √ | √ |
| Data Encryption | | | √ | √ |
| Data Encoding | √ | √ | √ | √ |
| Data Modulation | √ | √ | √ | √ |
| FDMA Channel Selection | | | | √ |
| PN code Generation | | | | √ |
| PN Code Modulation | | | | √ |
| Timing | √ | √ | √ | √ |
| Filtering | √ | √ | √ | √ |
| State Change | √ | √ | √ | √ |

FIG. 32

TRACON Terminal Control Center Messaging Functions

| **Messaging** | **Messaging** |
|---|---|
| **Transmitter Aircraft Sorting Functionality** | **Message Content** |
| | **Message 1 includes (X2 for message sent twice)** |
| | ADS Reply Request 1 bit |
| Receive Aircraft Positional Information | May include (X2 for message sent twice) |
| From Aircraft Trackers | 48 bit PN initial code state setting X2 |
| From Enroute ATC-Handover | K bits for PN Code selection (0 to 10) X2 |
| Receive Aircraft ATC messages | 4 bit FDMA channel selection X2 |
| Receive A/C ground computer messages | 9-10 bit code randomized reply start time X2 |
| Sort Aircraft by | 4 bit power control setting |
| Beam Location | ATC collision avoidance message |
| Schedule by Beam State | ATC metering & spacing message |
| Sort By Message per Aircraft per Beam State | ATC separation assurance message |
| **Receive Messages from A/C** | A/C ground computer collision avoidance message |
| Send position information to TRACKER | A/C ground computer metering and spacing message |
| Send position information to External Interface | A/C separation assurance message |
| Send security parameter acks to Library | **Sort Message 2 by priority** |
| Send ATC message acks to External interface | Message 2 may include |
| Send ATC message acks to External interface | X2 for message sent twice |
| | Decryption N bit delay state per 300 message bit set set |
| | Equals 2.7Kbps X2 |
| | ATC Collision avoidance message |
| | ATC metering & spacing message |
| | ATC separation Assurance message |
| | A/C ground computer collision avoidance message |
| | A/C ground computer metering and spacing message |
| | A/C separation assurance message |
| | ATC weather condition message |

FIG. 34

TRACON Terminal Control Center Library Functions

| Library |
|---|
| |
| Generate a library of Encryption/Decryption message sequence states |
| Generate a library of PN Code message start states |
| Generate a library of random reply start states |
| Maintain a FDMA set of frequency allocation states |
| |
| Assign and maintain record of allocation for |
| All A/C located in TRACON |
| Assignments per |
| FDMA channel |
| Encryption/Decryption code |
| PN code |
| Randomized message start |
| Power control setting |
| Terminal settings |
| |
| Provide encryption code per A/C to transmitter |
| Provide receiver frequency channel allocation per A/C per receiver |
| Provide receiver estimated time of arrival all A/C messages per beam, per state |
| Provide receiver PN code per A/C for all A/C |
| Provide receiver decryption code per A/C for all A/C |
| Provide power control setting |

FIG. 35

TRACON Terminal Control Center Randomized Parameter Setting, Tracking and External Interface Functions

| |
|---|
| **Terminal Randomized Parameter Settings** |
| Provide encryption code per A/C to transmitter |
| Provide receiver frequency channel allocation per A/C per receiver |
| Provide receiver estimated time of arrival all A/C messages per beam, per state |
| Provide receiver PN code per A/C for all A/C |
| Provide receiver decryption code per A/C for all A/C |
| **TRACKER** |
| Set up and maintain tracker for each aircraft in the TRACON |
| Allocate aircraft to proper beam |
| **External Control Center Interfaces** |
| Provide received ATC messages, for aircraft, to the Message Generator. |
| Notify TRACKER and Library of aircraft entering the TRACON |
| Provide the TRACON the initial position state for entering A/C |
| Provide ATC message replies to the appropriate external control centers |
| Provide appropriate control centers of aircraft transitioning out of TRACON |
| Provide A/C message requests to appropriate ATC center |

FIG. 36

TRACON Ground Terminal Options B&C
Key DSP Functions for Transmitter & Receiver

| Digital Signal Processor per Channel | | |
|---|---|---|
| Key Functions | | |
| **Receiver** | **ADS-S-Option A** | **Option B& C** |
| Filtering | √ | √ |
| Timing | | √ |
| FDMA Channel Selection | | √ |
| PN Code Selection | | √ |
| PN Code Acquistion | | √ |
| Carieer Acquistion | √ | √ |
| Carrier Tracking | √ | √ |
| PN code Tracking | | √ |
| Symbol Sync | √ | √ |
| Data Demodulation | √ | √ |
| Data Decode | √ | √ |
| Decryption | √ | √ |
| Data distribution | √ | √ |
| State Change | √ | √ |
| Receive beam formation | | √ |
| Receive beam control | | √ |
| Measure C/N | | √ |
| **Transmitter** | | |
| Data Reception | √ | √ |
| Data Scheduling | √ | √ |
| Data Encryption | √ | √ |
| Data Formatting | √ | √ |
| Data Encoding | √ | √ |
| Data Modulation | √ | √ |
| Transmit beam control | | √ |
| Transmit beam formation | | √ |
| Timing | | √ |
| Filtering | √ | √ |
| State Change | √ | √ |

FIG. 39

Use of a Navigation Backup System for a ADS Secure Backup

Mode S-S Secure ADS-S Backup

AUTOMATIC DEPENDENT SURVEILLANCE SYSTEM SECURE ADS-S

REFERENCE TO RELATED APPLICATIONS

The present application is based on provisional application No. 60/856,830 filed Nov. 6, 2006 and provisional application No. 60/902,867 filed Feb. 23, 2007, the priority of each of which is claimed.

BACKGROUND AND BRIEF DESCRIPTION OF THE INVENTION

Until the 1980's, controllers using surveillance data, derived from the ATCRBS and Mode S systems, tracked aircraft and provided separation assurance and, when necessary, collision avoidance warnings and maneuver instructions. With the initiation of TCAS, collision avoidance, for equipped aircraft, could now be performed independently by the pilot. The TCAS system leveraged the FAA surveillance system so that tracking functionality was derived from a system that was independent of the navigation VOR/DME system.

With the advent of augmented GPS, ATC navigation could be made extremely accurate everywhere and at a reduced cost to the FAA. It was only natural that the concept of leveraging GPS and/or Galileo (and/or equivalent satellite navigation system) for tracking, separation assurance, and collision avoidance be explored. Such a system is the automatic dependendent surveillance ADS-B.

The following quotes from the ADS-B web site describe its functions and its benefits. Standards for Automatic Dependent Surveillance—"Broadcast (ADS-B) is currently being developed jointly by the FAA and industry through RTCA Inc. Special Committee 186 (SC-186). The concept is simple: Aircraft (or other vehicles or obstacles) will broadcast a message on a regular basis, which includes their position (such as latitude, longitude and altitude), velocity, and possibly other information. Other aircraft or systems can receive this information for use in a wide variety of applications. Current surveillance systems must measure vehicle position, while ADS-B based systems will simply receive accurate position reports broadcast by the vehicles."

"In comparison with today's surveillance system, ADS-B's accuracy is now determined by the accuracy of the navigation system, not measurement errors. The accuracy is unaffected by the range to the aircraft. With the radar, detecting aircraft velocity changes requires tracking the received data. Changes can only be detected over a period of several position updates. With ADS-B, velocity changes are broadcast almost instantaneously as part of the State Vector report. These improvements in surveillance accuracy can be used to support a wide variety of applications and increase airport and airspace capacity while also improving safety."

The use of augmented GPS/Galilco for navigation, separation assurance and collision avoidance takes advantage of the three dimensional high accuracy that satellite based positioning can provide. This improved accuracy can indeed allow for closer spacing (increased capacity). Given that all tracking is derived from aircraft instrumentation, then the potential is that nearly all ATC can be performed in the cockpit, which would eliminate the need for most controllers and active surveillance systems. The result being a higher capacity system at a significantly lower cost when referenced to today's system. This is the potential and significance of ADS-B.

The problem is today's surveillance system is not safe and ADS-B will make it even less safe. A saboteur can obtain accurate position locations of aircraft today by using multilateration on Aircraft Mode S/ATCRBS replies to obtain range, position and tracking information of aircraft in the TRACON airspace. Thus a small missile can be GPS navigated to an accurately tracked target.

Multilateration is a technique whereby one measures the time of arrival from four or more widely separated receivers, and takes the difference in the time of arrivals to determine the position of the transmitting aircraft. If the signal is strong and readable and the geometry is good, than accurate position measurements can be made. By good geometry is meant that the transmitting aircraft is roughly flying to positions which are within the area set up by the ground receivers. The small missile threat is limited to the TRACON area since range and altitude are constrained by the missile size.

Today's air traffic control surveillance system is comprised of the radar beacon system (ATCRBS) and Mode S (discrete address beacon system). As a backup system the FAA has developed and aircraft are equipped with the Traffic Alert and Collision Avoidance System (TCAS). This system uses data received from airborne transponders responding to their ATCRBS/Mode S interrogations. The TCAS receiver then performs a two-way range measurement, reads the ATCRBS message to determine altitude and aircraft identity and finally makes a rough bearing measurement. The range measurement is performed by taking the difference between the times of arrival of the reply to the time of transmission of the ATCRB interrogation.

With respect to the multilateration threat, a saboteur need only purchase 4 TCAS receivers which are modified to determine time of arrival and possibly altitude for both ATCRBS or Mode S replies to TRACON ATCRB/Mode S interrogations, use a GPS/WAAS time transfer unit at each site to insure relative timing accuracy measurements between receiver sites and a TCAS like algorithm for determining tracks. Thus there is some investment and engineering that has to be performed by the terrorist to exercise this threat.

ADS-B is far worse. A saboteur need have only one aircraft ADS-B commercial radio. This enables him to receiver ADS-B messages that provide position and aircraft identity information and to track all aircraft in the vicinity. That is what commercial ADS-B avionic equipment is designed to do. Small modifications allow the saboteur to extract this information to provide continuous track information. Thus one can use small guided missiles which navigate accurately using GPS and which track multiple A/C accurately using GPS. No visual citing required.

How accurate is ADS-B? In addition to GPS, aircraft utilize the wide area GPS augmented system (WAAS) to improve the system. The following is a quote from the FAA web site. "The WAAS message improves the accuracy, availability and integrity (safety) of GPS-derived position information. Using WAAS, GPS signal accuracy is improved from 20 meters to approximately 1.5-2 meters in both the horizontal and vertical dimensions." In the future with the next generation GPS and with the use of GPS together with Galileo the accuracy uncertainty will reduce to under 1 meter.

Encryption of ATC surveillance replies would deny position data to the unauthorized.

Can ADS-B messages be encrypted? Because of the way ADS-B works all aircraft within a given geographic area would have to use the same security codes since all are transmitting and all are receiving each other's ADS-B transmissions. This would be a group encryption so that every IFR pilot (and possibly General aviation pilots) within a region could obtain this information. If one pilot were a terrorist he could relay it to another terrorist on the ground. The group encryption requirement would thus be ineffectual no matter what the update rate was for changing the group encryption code. As a result message security cannot be achieved with ADS-B.

In summary, the surveillance system today can be used by terrorists to inflict great damage in the TRACON airspace. The transition to ADS-B increases the threat significantly, by increases the accuracy of target tracking and substantially reduces the resources needed to carry out a multi missile attack.

The objective of this invention is to provide security, to the surveillance system within the TRACON airspace, against terrorist small missile attacks.

There are a number of strategies for implementing a more secure ADS system. These are defined as ADS-S systems. The selection of the system will be a function of the cost of implementation, the level of security and the associated resources required by the saboteur to counter the security technique. Thus the goal is to implement sufficient security of the ADS-S system so that it is unrealistic for the terrorist to counter the secure system. Three options are given for implementing a secure system. The first (option A) provides only message security. The second and third options ensure that messages cannot be read and multilateration cannot provide the terrorist aircraft tracks.

The invention assures that messages transmitted to/from an aircraft can only be read by the addressed user aircraft and by the ground ATC system. Surveillance messages can be made secure with authentication and/or encryption. This insures that a WAAS based terrorist GPS tracking system cannot be achieved.

The invention, in options B and C, assures that transmissions from the aircraft to the ground need to be designed so that aircraft cannot be tracked by using multilateration ranging measurements and a set of such measurements to form accurate aircraft tracks.

Transmissions from the aircraft have to utilize techniques which do not allow successful ranging and/or tracking. One such technique, as demonstrated in this invention utilizes a hybrid FDMA system with pseudo random (PN) codes which spread the signal over a wide bandwidth relative to the information bandwidth. Thus there are many PN chips that are transmitted within one information or framing bit. The PN code is made up of ±1 chip values so that the average sum value of all chips in a framing bit is about zero. As will be shown this can be achieved when a long code is used to spread the signal under the noise. A second element in ensuring that the ADS-S signal cannot be ranged on is to design the system so that it is transmitted under the noise as seen by the saboteur's terminal. Several design options for achieving this are presented.

To ensure security, each aircraft, at the start of its flight, is given an identity code, an encryption code and a spread spectrum code (options B & C). This information can be transmitted within the ATC system via secure terrestrial networks. Any or all of these codes can be changed dynamically, via commands from the ground ADS-S TRACON terminals. To achieve a highly secure surveillance system, A/C cannot squitter (short transmission burst containing ADS information) their location.

The Enroute system utilizes the ADS-B system. The invention is so designed that ADS-B in the Enroute airspace and ADS-S in the TRACON airspace do not cause mutual interference to one another.

The system is so designed that ATCRBS/Mode S operating with ADS-S, in the same TRACON airspace, does not cause mutual interference to one another. This design is necessary to insure a transparent transition from ATCRBS/Mode S to ADS-S.

The ADS-S system is designed with a high data rate ground-air (uplink) capability in the multiple megabit range.

The system is designed to support traditional centralized ATC and with an option for a hybrid distributed and centralized ATC system within the TRACON airspace.

The invention provides three options for a secure surveillance backup system, namely:

1. Using the ADS-S terminal to perform 2 way ranging, bearing determination using monopulse detection and receiving the barometric altitude reading in the ADS formatted message.
2. Transmitting a navigation backup system position determination via an ADS-S formatted message to the ground terminal.
3. Knowing the time an aircraft is interrogated by the ADS-S terminal means that only an additional two terminals are needed to multilaterate.

If multilateration is designed as the surveillance backup system it can also be used as an anti spoofing system even when the ADS-S system is operating normally.

DESCRIPTION OF THE DRAWINGS

The above and other advantages and features of the invention will become more apparent when considered with the detailed design and accompanying drawings wherein:

FIG. 3 provides the methodology used for determining the maximum number of aircraft within a TRACON.

FIG. 4 provides the ADS-S Ground/Air link budget for the TRACON.

FIG. 5 provides the acquisition time uncertainty budget.

FIG. 6 provides the worst case aircraft Doppler, which basically defines the acquisition frequency uncertainty budget.

FIG. 7 provides the number of parallel correlation sets needed to acquire the PN code when time and frequency uncertainty are accounted for.

FIG. 8 provides the acquisition link budget for acquiring the ADS-S PN code.

FIG. 9 is a table which illustrates the improvement in the probability of detection when using a 3 out of 5 decision rule when acquiring a PN code.

FIG. 10 provides the ADS-S air/ground TRACON data link budget.

FIG. 11 is a table showing the key characteristics of the three ADS-S implementation options.

FIG. 15 summarizes the key parameters for the encryption design given in Option A.

FIG. 18 summarizes the key encryption parameters for options B & C.

FIG. 20 illustrates, for a 1 Kbps data burst rate and a 189 Kcps PN code rate per FDMA frequency channel, via a time line, how ADS-S uses spatial diversity with a phased array antenna which forms 3 beams simultaneously.

FIG. 23 illustrates the PN code length key parameters.

FIG. 26 illustrates a TRACON aircraft flight model used to understand the saboteur's best case strategy.

FIG. 27 illustrates the impact of the saboteur's best case strategy.

FIG. 28 illustrates, for Option B, ADS designs that can counter the saboteur's best strategy.

FIG. 29 illustrates the benefits of Option C.

FIG. 32 is a table which illustrates the key digital functionality, within the air terminal SDR, required for the aircraft in ADS-S TRACON airspace and in ADS-B Enroute airspace. Included is the functionality required for Mode S/ATCRBS during the transitional period.

FIG. 34 is a table describing the key functions of the messaging element of the control center.

FIG. 35 is a table that provides the key functions of the library element of the control center.

FIG. 36 is a table which describes the key functions of the randomization, tracking and external interfaces elements of the control center.

FIG. 39 is a table which illustrates the key digital functionality, for a ground terminal SDR, to support ADS-S operations in TRACON airspace for Options A, B & C and ADS-B in Enroute airspace.

DETAILED DESCRIPTION OF THE INVENTION

The fundamental elements of this invention is the utilization, within the TRACON, of encryption to ensure that the ADS message cannot be read and the use of PN coding to ensure that a terrorist cannot multilaterate on the aircraft's ADS transmission to obtain the aircraft position. The design utilizes well known encryption and PN coding techniques. It is the successful application of these techniques to a complex ATC environment where issues of data rate, multiple access noise, capacity, risk, bandwidth, spectrum allocation and compatibility with Enroute ADS-B and Mode S/ATCRBS are resolved, and that defines the invention. Derivative options for ADS-S are an anti spoofing system and an ADS-S backup system. These are also part of the invention.

ADS-S Tracon Operational Concepts

Basically there are two different options for operating within these areas. For either option, aircraft only respond when interrogated.

Figure 1:
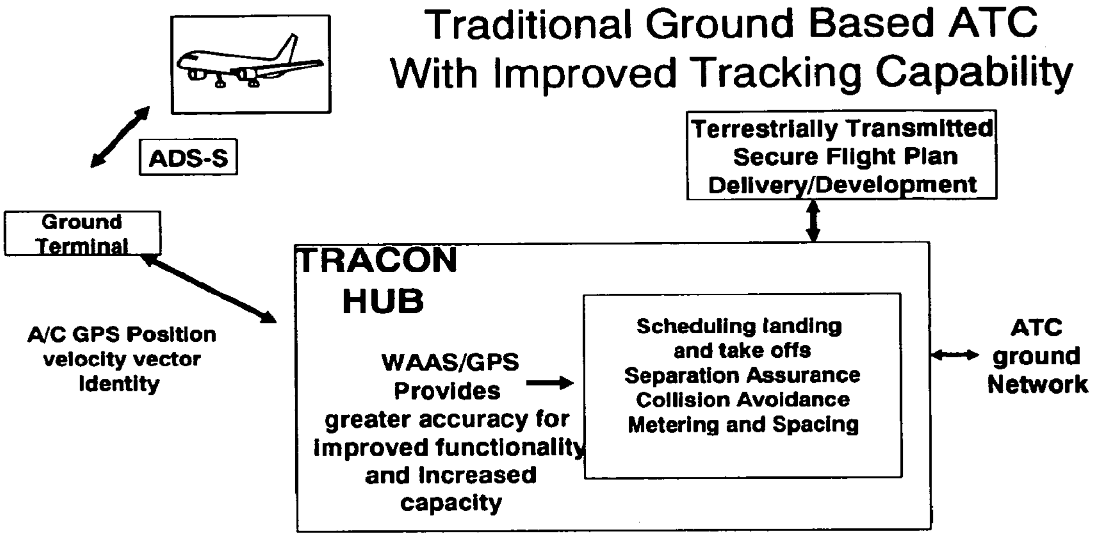
FIG. 1 describes the utilization of ADS-S in the TRACON using the standard central ground terminal approach.

In the first option (FIG. 1), the TRACON, via the ATC ground network, receives information from the Enroute ATC center that a handover is to occur for a given aircraft. That aircraft is then interrogated by the ADS-S ground terminal and the aircraft, flying into the TRACON, responds by providing its secure identity and GPS position and velocity vector together with other ATC information. The ground terminal sends the demodulated message to the TRACON hub which uses this information to together wither other information, to provide such functions as metering and spacing for landing while avoiding collisions.

If an aircraft is taking off, the TRACON HUB interfaces with the aircraft controller to receive flight plan information and provide the encryption code prior to takeoff. The encryption code can be transmitted directly to the radio prior to take off under the assumption that the code used on the last flight is still operational. As the plane prepares for take off the aircraft terminal receives an encrypted message providing the aircraft with its FDMA channel assignment and its PN code initial setting. The aircraft is then interrogated quasi periodically to provide position information so that it can carry out the functions of metering and scheduling for take off and routing through the TRACON airspace. As the aircraft approaches the TRACON boundary, it is handed over to the Enroute airspace via messages transmitted on the ATC ground network. The aircraft then changes its mode to operate ADS-B. This change may be automated to switch automatically when the aircraft rises above some level, such as 15,000 feet. The ATC functionality provided by the TRACON HUB is significantly improved because ADS provides GPS/WAAS positional and track accuracy.

This concept is easy to implement and is secure. The only possible disadvantage is that it doesn't give the pilot the autonomy that appears to be a goal and the potential savings that would possibly accrue by having fewer controllers on the ground.

Figure 2:
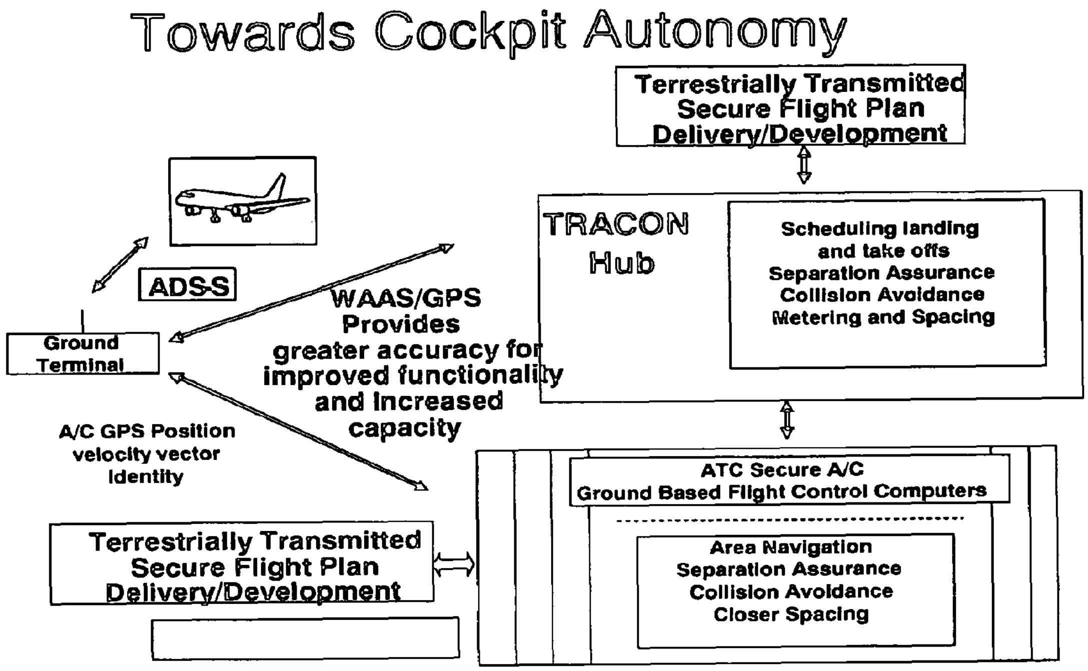
FIG. 2 describes the utilization of ADS-S in the TRACON in a hybrid configuration which provides a degree of ATC autonomy to the aircraft cockpit.

ADS-S does not allow aircraft to squitter in the TRACON so that ADS-B cockpit equipped aircraft cannot see their closest neighbors with GPS/WAAS accuracy. As described by FIG. 2, a ground based separation assurance computer processor is created, for each IFR aircraft in flight. That is the ADS-B airborne computer is now partitioned between the ground and the cockpit. Information necessary to ensure independent, quasi dynamic pilot flight plan A changes and fuel efficient area navigation plan together with safe separation assurance is transmitted to the pilot. This ground based computer functionality is in addition to all of the functionality provided by the TRACON Hub described for the first option and illustrated in FIG. 1. As with ADS-B there is coordination between ground control and cockpit control.

The option is more difficult to implement but is secure and provides the cockpit autonomy that appears to be a goal. Although more complex, today's and tomorrow's near term technology make this a very realizable option.

ADS-S Signal Transmission Implementation Options

There are a number of strategies for implementing a more secure ADS system. These are defined as ADS-S systems. The selection of the system will be a function of the cost of implementation, the level of security and the associated resources required by the saboteur to counter the security technique. Thus the goal is to implement sufficient security of the ADS-S system so that it is unrealistic for the terrorist to break the secure system.

Initially a design is provided where many of the constraints of coexisting with other surveillance systems are not considered. Once presented this ideal system is modified to account for the constraints imposed by ADS-B and ATTCRBS/Mode S, capacity, antenna design and spectrum allocation.

One key element of the design is capacity. That is the system has to be designed to support the maximum number of aircraft that can be in any TRACON airspace at any one time. FIG. 3 shows the maximum arrival rate per hour for each major airport in CONUS. This was obtained from the FAA web site. The web site describes for each day the maximum arrival rate that each airport can handle under the flight rule constraints of VFR (Visual Flight Rules), VAPS (Visual Approaches) and other conditions. Of these the maximum arrival rate is given either for VFR or VAP on a runway basis. The number reflected in the figure is the maximum at each airport that can be handled under the best of conditions.

Aircraft stay in the TRACON approximately 15 minutes. The estimate for departures was taken as equal to the max arrivals in the same 15 minute interval. A 50% margin was used and the results are shown in FIG. 3. It should be noted that of all the airports in CONUS only 2 exceed 100 aircraft (120 max) in the busiest 15 minute interval.

The Design for the Ideal Case

It is to be noted that although this is a surveillance system, the ground terminal is basically a communications terminal.

In this example the following key parameters are used.

The ADS command and reply occur in a ¼ second. A 8 MHz bandwidth is used on the ground to air link and a 6 Mhz bandwidth on the air to ground links.

The Ground to Air Link

The ground terminal is designed with an eight sectored antenna (9 dB gain). A ground/air link (1030) MHZ BW of 8 MHz, is used which is consistent with Mode S.

On this link one has only to be concerned with a non authorized listener in the air who hears the uplink transmission. To protect against such a listener, the uplink is encrypted with messages which provide aircraft identity and A changes to the spread spectrum code, the aircraft identity code, and the aircraft encryption code. This link can be designed to maximize data transmitted by using the entire 8 MHz BW to generate a near continuous data rate. There are many options for modulation and coding. To illustrate the design, an uncoded QPSK was used and provides 2 bits per.25 μs. Given this modulation technique, the number of information bits transmitted on the uplink can be bounded by 4.Mbps assuming a 50% factor for acquisition, framing pulses coding, and gaps between messages, etc. Note that a 300 information bit transmission occupies 37.5 μs of a message, and then assuming the 50% overhead factor, up to 13,333 messages of equal length can be transmitted per second for a total 4.0 Mbps. The link budget is given in FIG. 4. The downlink power has to be controlled and such commands are part of the uplink message.

The Air to Ground Link

A 6 MHz bandwidth was used for the air/ground link (1090 MHz) which is the same as what ATCRBS uses. It is desirable to use a wider BW. Bandwidth impacts the C/N ratio as seen by the saboteur. The wider the bandwidth the lower the C/N ratio. The assumption for the potential for the wider bandwidth is based upon the knowledge that GPS and/or Galileo (and/or equivalent satellite navigation system) augmented provide a better navigation system than DME so that its sites should be phased out allowing for a wider 1090 BW or a separate air to ground link frequency assignment in the DME band.

The air to ground link is an FDMA system where users are allocated a frequency channel and a PN code. The PN code has a 189 Kcps rate and the user data burst rate is 1 Kbps. The air to ground link uses encryption to protect the messages being read by unauthorized personnel. There are 15 FDMA channels in the 6 MHZ bandwidth that are used to both provide maximum security from unauthorized ranging on the transmitted signal and also to maximize the aircraft capacity that the system can support. There are many options for modulation and coding that can be used. In this example, the data bursts at 1 Kbps, uses QPSK modulation and a rate ½ code. A ¼ second ADS-S aircraft transmission reply is part of the design.

Assuming a 40% factor for carrier and code acquisition, code framing pulses, gaps between messages, etc., then a 150 bit message is sent in ¼ second to 15 users. Under the further assumption that ⅔rd's of the user's transmit 150 bit messages and ⅓rd 300 bit messages the system can then support 200 users in a 4 second period with an omni antenna. A four sectored doubles the number to 400. Note that the traffic model peak estimate is 120 (FIG. 3).

Multiple Access Self Interference

Since there is only one user per FDMA channel there is no multiple access noise as in GPS where users receive 5-12 PN codes in the same bandwidth.

The system is so designed that each user is given a unique code. Knowledge of the code that an airborne saboteur receives does provide any useful information as to what codes are being used by any other aircraft. Each PN transmission is designed so that a received C/N ratio is, nearly all the time, below the noise to avoid detection and utilization for multi Lateration position and tracking of aircraft by unauthorized users. To keep the C/N ratio low all aircraft transmissions are power controlled and are received with roughly the same signal power (within 3 dB).

To protect the secure codes and to ensure that all users have unique codes, all frequency and code allocations can be changed in a dynamic manner via commands from the ground control system.

Obtaining Data

To obtain digital data, the ADS-S PN code has to be acquired, the carrier has to be acquired, both PN code and carrier have to be tracked, symbol synchronization has to be achieved and the data has to be demodulated, decoded and decrypted. The most difficult operation is PN code acquisition. Note that the ground terminal knows the PN code assigned to each aircraft.

There are many algorithms to acquire code. The following is one example: To acquire a code one needs to know how large the time and frequency uncertainty windows are that need to be searched before a code can be acquired. As shown in FIG. 5, the time uncertainty budget is comprised of clock accuracy, aircraft transponder delay and range to the aircraft from the ground terminal Given that the aircraft has a WAAS/GPS receiver for navigation and the ground terminal could also utilize such a receiver, then utilizing these receivers, GPS time transfers can drive the ADS-S air and ground terminal clocks. The result is that extremely accurate relative time, in the order of nanoseconds, results. The aircraft transponder responds to a command from the ground. The transponder delay is in the order of 3.5 μs. Lastly the range uncertainty in the ADS-S case is relatively small since if the system is started on the ground, before take off, there is very little range uncertainty. In the case of an aircraft transitioning from the Enroute airspace to the TRACON, the aircraft is tracked so the position is known as accurately as the Enroutc system can track aircraft. If ADS/GPS based, this would be extremely accurate. If one assumes Mode S in the Enroute airspace and a 12 second time interval between the last interrogation of Mode S and the first interrogation of ADS-S, then a range uncertainty of 6000 feet result. Based on these numbers and adding margin, a 20 μs uncertainty time interval results as shown in FIG. 5.

The Doppler has to be accounted for in code acquisition and for carrier tracking. As shown in FIG. 6 the Doppler for 300 m/hr (500 ft/s) results in a frequency offset of 545 Hz.

At the start of the GPS era, GPS Gold codes could only be searched sequentially in time. For a GPS code that meant determining which half chip of 1023 chips could provide the maximum and correct code synchronization. This process took many seconds to acquire because of the limitations in digital electronic capabilities which required serial chip searches. Today all half code chip sets can be searched in parallel and acquisition can be achieved in a fraction of a second The ADS-S is unique in that one knows almost the time that the PN code was transmitted. The search is only 8 half chips for a 189 Kcps PN code rate (16 for a 278 Kcps rate and 32 for a 556 Kcps). This search can be performed using parallel correlators and coherently integrating over a data bit interval In this case the smallest acquisition IF filter is 2 KHz. The Doppler uncertainty widens the bandwidth to 3090 Hz. To reduce the frequency uncertainty 10 frequency bins are created. Thus, as shown in FIG. 7, 80 parallel correlation sets of operations occur to obtain code acquisition.

To improve the probability of correct signal detection, the signal is coherently correlated over a 9 bit interval. This provides a 9.5 dB signal to noise ratio improvement in the code acquisition correlation filter band . . . . As shown in FIG. 8, the selected ½ chip will have obtained a maximum energy to noise equivalent ratio of 28.09 dB over 9 ms. This is very healthy even if there are 10 dB of losses. Losses can occur from antenna signal degradation when aircraft bank, multipath, Doppler, timing and non ideal power control. It should be noted that the maximum Doppler in the TRACON has already been accounted for resulting in a 1.9 dB loss as the correlation bandwidth is widened to account for frequency uncertainty. Since both the aircraft and the ground receiver will use GPS/WAAS derived time, the relative time will be accurate to within a few nanoseconds. Multipath has to be controlled by properly siting and implementing the ground terminal.

The decision rule could be based on the 9 ms acquisition period. However if a 3 out of 5 decision rule is used there is an improvement in the probability of making a correct ½ chip decision, Let Pd equal the probability of correct detection in finding the correct ½ chip after coherently correlating over 9 ms. Let Pnd equal the probability of incorrect detection in finding the correct ½ chip after coherently correlating over 9 ms. Let PD equal the probability of correct detection after applying the at least 3 out of 5 correct Pd rule after 45 ms.

As shown in FIG. 9 the correct decision algorithm improves performance considerably.

This is but one decision rule strategy. There are many more. This strategy used takes 45 ms to acquire which fits within the allotted budget for acquisition.

The acquisition of the PN code in a small frequency uncertainty bin and with a very large correlation IF signal to noise ratio leads to a rapid resolution of carrier frequency and symbol synchronization.

The data demodulation link budget is given in FIG. 10. As shown and as designed, the margin is 12.08 dB. Again this should provide a robust data link. Note that this is achieved with maximum power of only 1 mw. This is because the data bit is 1 ms long and not 0.25 us as on the ground to air link.

Modifying the Ideal to Account for Reality Constraints

Adding ADS-S to an integrated system poses some design problems namely: during the transition Mode S/ATCRBS secondary radars are used in the TRACON and the two systems can cause interference to one another and there exists the potential for interference with Enroute ADS-B.

The following are implementation options which demonstrate how this can be resolved. The selection of the system will be a function of the cost of implementation, the level of security and the associated resources required by the saboteur to counter the security technique.

The goal is to implement sufficient security of the ADS-S system, at the lowest implementation cost, so that it is unrealistic for the terrorist to break system security.

Implementation Options

Three options are described for implementing ADS-S. The key characteristics of each are summarized in FIG. 11. All options utilize ADS-B in the Enroute airspace but differ in there TRACON implementation of ADS-S. All options are designed so that there is no mutual interference between ADS-S, ADS-B and Mode S/ATCRBS. It should be noted that there is a probability of overlap between ADS-B transmissions and Mode S/ATCRABS transmissions but it is small and is accounted for in the design of ADS-B. All options use the 1030 MHz center frequency for ground to air transmissions. Option A only has encryption security in the TRACON airspace and aircraft transmit on 1090 MHz. Options B & C provides both encryption and multilateration security in the TRACON airspace. They differ in that in Option B aircraft transmits on 1090 MHz and with Option C aircraft transmit on 990 MHz.

In all options ADS equipped aircraft do not respond to Mode S/ATCRBS interrogations in the TRACON.

ADS-S Option A

Prior to flight take off, but while the aircraft is within the terminal an ADS-S interrogation, encrypted with the aircrafts prior flight encryption code, sets the aircraft decryption and encryption codes for the start of the next flight. These codes can be changed on a 2-4 second basis.

The ADS-B Enroute operates in its normal quasi squittering 1090 mode since ground missile sabotage is not a likely event at Enroute altitudes. The aircraft operates as ADS-S when its altitude is less than 15,000 ft. and random squittering does not occur. Within the TRACON aircraft transmit only in reply to interrogation from the ground.

In this option PN codes are not used but individual encryption codes secure each ADS transmission. This insures that the message cannot be read and that a terrorist cannot obtain aircraft identity or GPS tracking accuracy of the aircraft. There is no PN code so that multilateration can provide the terrorist ranging information. However the terrorist cannot read the message, as he can with Mode S and obtain aircraft identity or GPS accuracy, with the result that a sequence of range measurements are made relating to several different aircraft transmissions. The terrorist then has to figure out which subset of ranging measurements to associate with a true aircraft track. This can be achieved using TCAS like equipment and algorithms; however this increases the terrorist resources required for tracking ADS-S equipped aircraft as compared to tracking Mode S/ATTCRBS equipped aircraft.

Within the TRACON the ADS-B format, with individual A/C encryption codes, is used. Aircraft respond with an ADS-B formatted transmission to the ground interrogation.

Option A Encryption and Decryption

To protect the content of a message, data to the aircraft has to be encrypted and data from the aircraft has to be decrypted. It is assumed that a terrorist team can have a pilot flying IFR in a TRACON with someone on the ground that he can communicate with. Thus the terrorist can be assumed to have a commercial avionics box that can be modified. The code design needs to be such that even with such resources, no knowledge is gained with respect to the other messages being sent from other aircraft. There are a number of code sets that can be utilized for the encryption process. The following provides an operational procedure for managing the codes and presents a set of feasible codes that can be used with this procedure.

Figure 12:
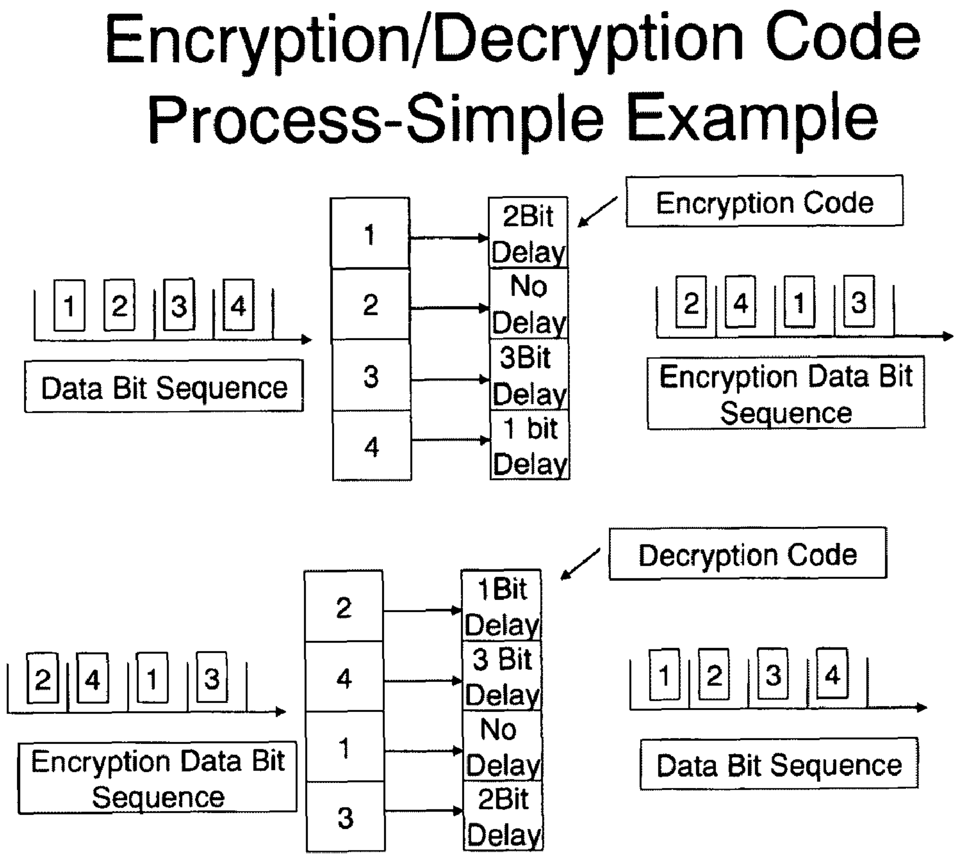
FIG. 12 describes, in a simplified example, how encryption and decryption codes work.
Figure 13:
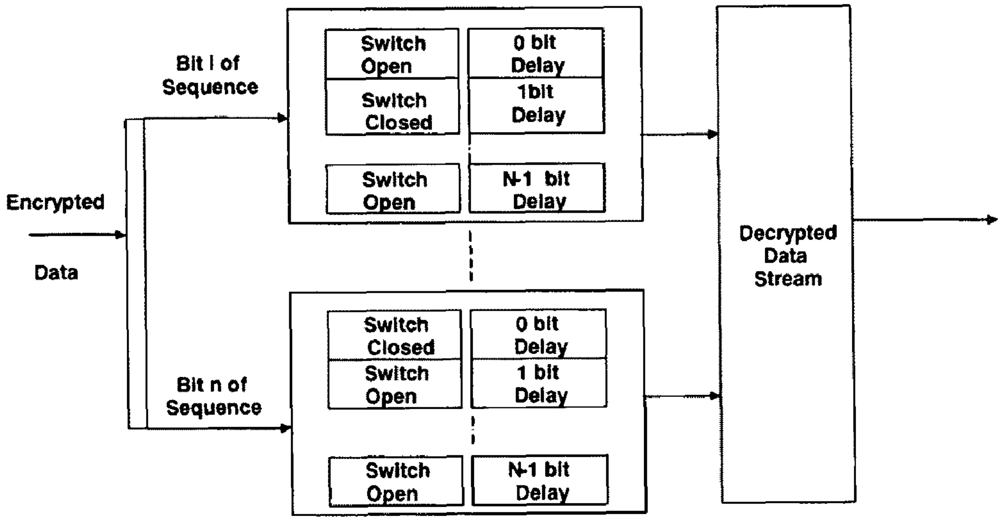
FIG. 13 describes the operational ground antenna beam forming states for Option A.
Figure 14:
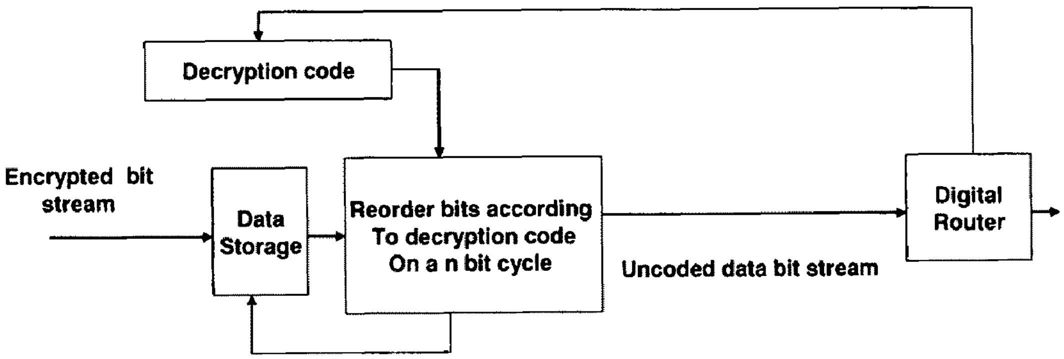
FIG. 14 describes the Decryption process.

To understand the process a simple example is given. Assume that a 4-bit data stream has to be protected and sent from the ground to the aircraft. One way is to scramble the data sequence. There are $2^4$ options, or 16 possibilities to do this. One can be selected. Thus the data stream is realigned so that the bit sequence is 2,4,1,3 (1,0,0,1) instead of 1,2,3, 4 (0,1,1,0). This is described in FIG. 12. To read the data properly at the other end, the ground then transmits this sequence code to the aircraft. Since there are 4 bits, each number in the coded sequence can be defined uniquely by 4 bits. Given that each of the bits of the sequence has to be defined as to there order in the sequence a total of 16 bits are transmitted, 4 per bit sequence placement. This can be conceptualized by viewing FIG. 13. A sequence of N encrypted bits, are demodulated, and placed in a vertical array. Each bit of the array has a set of switches and each of these is followed by a fixed delay. Thus switch one has no delay while switch 2 has a 1 bit delay and switch 3 a 2 bit delay and finally switch N has an N−1 bit delay. Each bit in the sequence has the same set of switches and delays. The decryption code determines which switch for each bit should be closed (or open). Each bit in the vertical array has a unique switch open so that the encrypted code is descrambled and the correct sequence of data bits is uncovered. FIG. 14 shows the flow of this process at a high level. If the code transmitted is 128 bits and N equals 4, then there are 32 cycles that are sequenced through to complete the decryption of the entire message.

In the simple example, where N equals 4, the key issues that need to be addressed are uncovered. An unauthorized user on the ground needs to demodulate the data and then determine which one of 16 sequences provides the correct data sequence. The aircraft has to always have a unique decryption code or else other aircraft can read the message and determine security code updates. Some messages are in general easy to descramble as compared to others. Thus if the number of is in the data sequence is only one or the number of 0s is only one that is easy to unscramble as compared to the number of 1s and 0s being equal. In addition other intelligent information such as frame formatting, comparing a sequence of encrypted messages and intelligence as to the nature of the data content can reduce a search window.

To provide a nearly unbreakable code, the code sequence cycle is made long and encryption includes both the data bits and the block error correcting bits. This tends to even out the number of 1s and 0s and makes it more difficult to use other sources of intelligence.

The number of codes that can be generated and the probabilities of the different sets of sequences that have a given number of 1s and a given number of 0s together with the probability that such a set occurs is described by the binomial theorem. That is if the apriori probability of a one occurring and the probability of a 0 occurring are equally probable, then the probability of K1s out of N bits is given by:

$$\text{Probability of } K1s \text{ out of } N \text{ bits} = (N!/K!(N-K)!)(\tfrac{1}{2})^N$$

For reasonable values of N, the number of sequences that would have to be searched to decrypt, with little information, is extraordinarily high. For example, when N equals 75 the number of sequences to search would be greater than $10^{21}$, for N equal to 120 the number would be greater than $10^{34}$ and for N equal to 150 the number is greater than $10^{43}$ If this is extended to N=240 bits, the number of possible sequences is so large a powerful computer could not determine its value.

For option A, N is taken to be 240. The number of switches per bit in the coded sequence is 240 and a decryption code message of 8 bits defines the switch-delay required to uncover the bit in its correct sequence. There are 240 of these bits so that the decryption message is 1.92 Kbps. Within the described design the encryption message can be repeated twice in the same transmission or sent twice. If both have the same decryption sequence then the code is changed. If not, it is not changed until 2 identical messages are received. Since there is a 1 to 1 correlation between the decryption code and the encryption code, the aircraft radio knows its encryption code if the encryption code is kept the same on both the ground to air and air to ground links.

Since there are at least a trillion codes, radio manufacturers are given a few codes to use to allow them to perform end to end testing of the avionics. The received radios are installed in aircraft with the code set to the test code values. This is preferably done at major airports where the radio is tested by the FAA/USA or by the appropriate authority in other nations. A new decryption and encryption code is radioed to the aircraft for the next set of ADS-S messages, in a controlled environment at the airport. This process provides the initial pair of codes. Thus each aircraft is given its own set of codes and these codes can be changed at any time the aircraft is in the TRACON.

The ground to air message will request ADS position information using the operating encryption code. The transmission from the ground will also inform the aircraft, what encryption code it will be interrogated with the next time and what encryption code to reply with. Modifications to the uplink format need to be made for the encryption/decryption messages and the transmission of code changes. Formats for transmissions to aircraft need to be created. Indeed a format or formats need to be defined. For short messages such as requests for an ADS-B transmission the existing 1090 formats can be used. For transmitting encryption update codes the UAT ADS-B ground to air format can be used. A 3.84 Kbps encryption code update is sent frequently and the UAT format allows for 4416 payload and parity bits.

The ADS-S transmissions are on the same frequencies as used by the Mode S/ATCRBS system. Thus there is some mutual interference concerns. In particular if the design is for 200 aircraft to update their encryption codes, then 760 Kbits have to be transmitted. If updates occur once every 4 seconds on the average, then 140 Kbps are transmitted every second. To account for such possible concerns the ADS-S communication links can be implemented several different ways.

Figure 16:
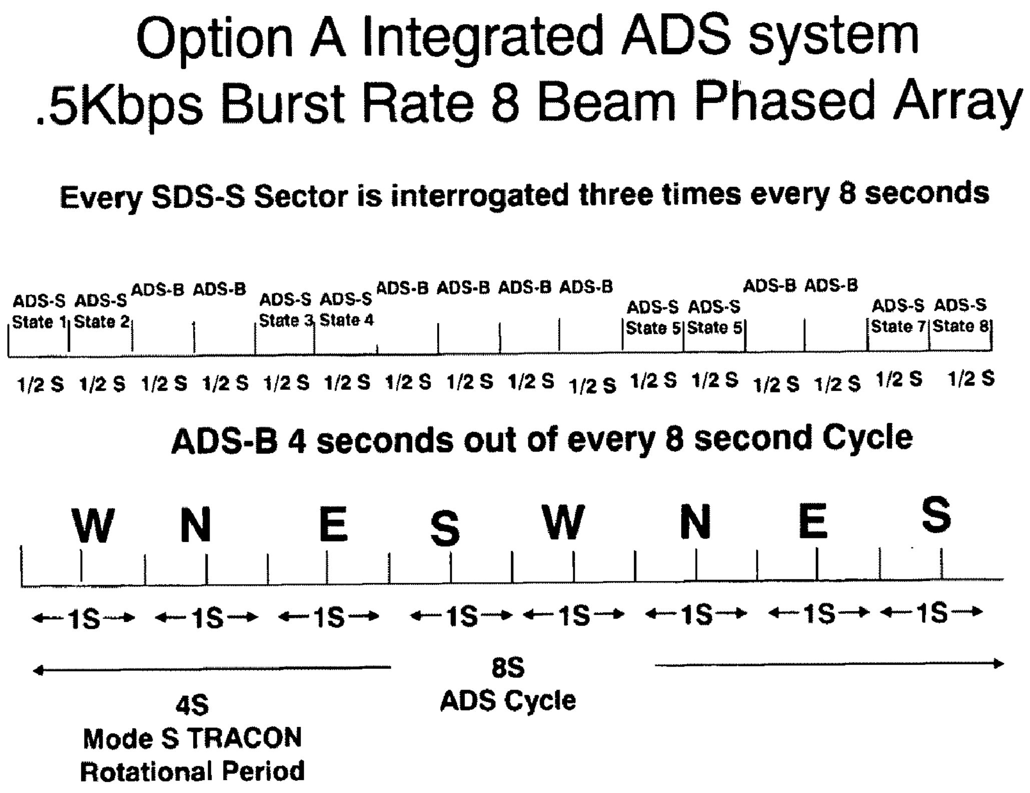
FIG. 16 describes how an 8 beam phased array antenna can be utilized to support an integrated ADS system for Option A.
Figure 17:
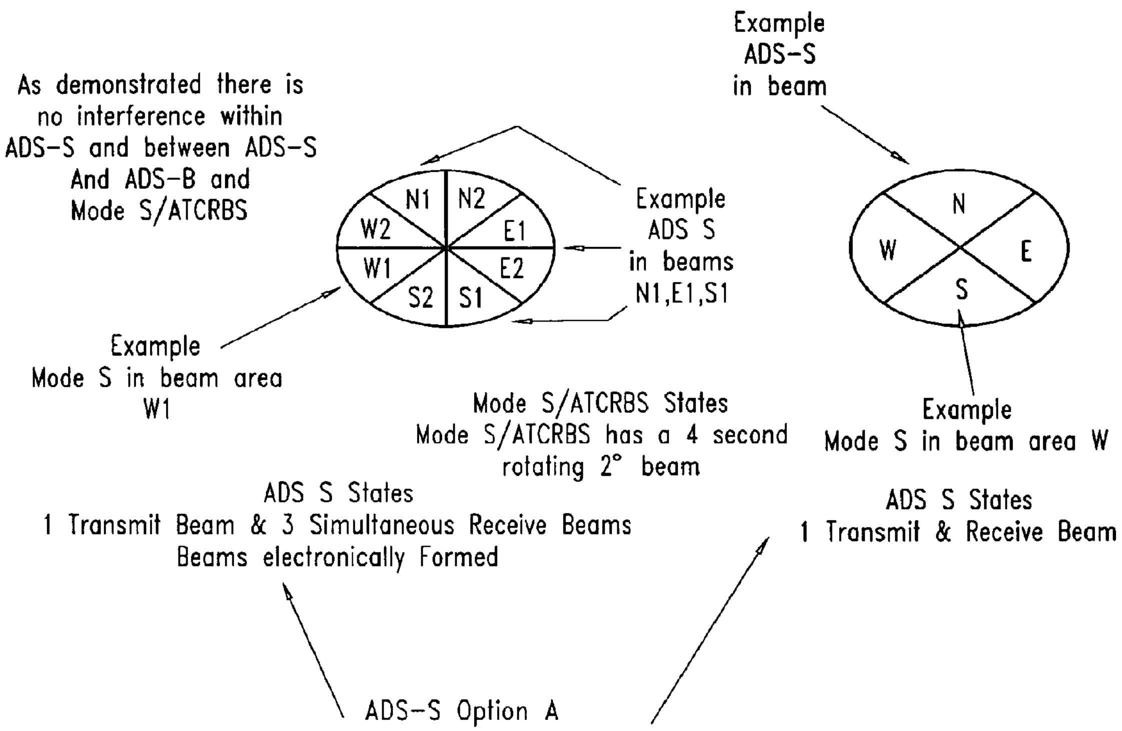
FIG. 17 describes operational states for ADS-S communications for Option A.

The ADS-S uplink could be transmitted from the ATCRBS/Mode S terminal. Indeed ADS-S replies can be received by the same terminal. That is using range order algorithms ATCRBS, Mode S and ADS-S signals can be transmitted by the same terminal. Since Mode S and ADS-S are range ordered, their replies do not interfere with one another. ATCRBS transmissions are given sufficient time to reply that no interference would occur to either Mode S or ADS-S. Given that an aircraft, ADS-S equipped, does not receive Mode S interrogations and that the transmissions and replies are garble free, a 4 second update in the TRACON should be sufficient. If not an omni antenna can be considered or a sectored antenna which operates spatially orthogonal to Mode S can be considered. These requests can be made, on the average once a second. As an alternative, FIG. 16 and FIG. 17 describe sectored antennas that can be used to avoid any interference on 1030 and on the 1090 reply by using spatial separation. This implementation would interleave Enroute ADS-B transmissions with TRACON ADS-S transmissions so there is no interference with one another. The TRACON beams formed are designed not to interfere with Mode S/ATCRBS As shown an 8 segment antenna can interrogate the same airspace 3 times every 4 seconds, while the 4 sectored antenna can provide multiple replies from an aircraft within a second, every 4 seconds.

Exclusive of the ground terminal and except for the requirement of no squittering within the TRACON and the encryption of messages on all TRACON links, the system looks like ADS-B. This is especially true if an omni directional antenna was chosen for the ground terminal.

From an aircraft perspective, an encryption/decryption capability has to be added to the aircraft. If TRACON ground system is integrated into the Mode S/ATCRBS terminal a relatively simple integration occurs and a very natural transition from Mode S to ADS-S evolves. Generating encryption/decryption codes and managing these codes is a function that modifies the ground terminal. Code management also means coordinated management via ATC secure landlines. If a sectored antenna is desired, then time synchronization, through the utilization of GPS, is required within the TRACON.

ADS-S Option B

Encryption and decryption codes for the aircraft and the management of the keys to the code are similar to that described for Option A. However, as shown in FIG. 18, the code set options are different for a 150 bit data message. Although different, the results are similar. Assuming the same encryption code is used on both ADS-S links, a 5.4 Kbps message needs to be transmitted whenever the aircraft decryption/encryption code are updated. For a 1.8 MHz ground to air data link, 333 aircraft can be supported every second. Assuming an average 4 second update rate, then such messages represent less than 20% of the data link capability under the assumption that closer to 200 aircraft will be in the TRACON at any one time.

As discussed in Option A the aircraft encryption code, at the beginning of a new flight is the same as the code used at the end of its previous flight. What differs is that in addition to the encryption code, the PN code and the 1090 frequency channel also used on the previous flight are all used at the start of the new flight. The A/C radio while still in the terminal receives an ADS-S message providing new codes and a new frequency assignment.

In Option B both encryption and PN coding are used, within the TRACON, to prevent unauthorized reading of ADS messages and unauthorized tracking of aircraft using multilateration techniques. To achieve these capabilities, the design accounts for Mode S/ATCRBS (TRACON) mutual interference, ADS-S interference between TRACONS and between ADS-B (Enroute) and ADS-S (TRACON) mutual interference, aircraft capacity, operational complexity, antenna size, relative regulatory issues associated with frequency and bandwidth allocations. In addition the design needs to maximize the cost to the saboteur to beat the system. The analogy is with an anti jamming system which also tries to maximize the cost of successful jamming. Note that reply format for ADS-S is significantly different than that of either ADS-B or Mode S.

The Mode S/ATCRBS terminal cannot be used to transmit and receive ADS-S messages since the 1090 bandwidth is PN spread to keep the signal below the noise. Thus the data capacity is limited and the data transmissions long. They are so long that they would definitely interfere with Mode S/ATCRBS operations.

Figure 19:
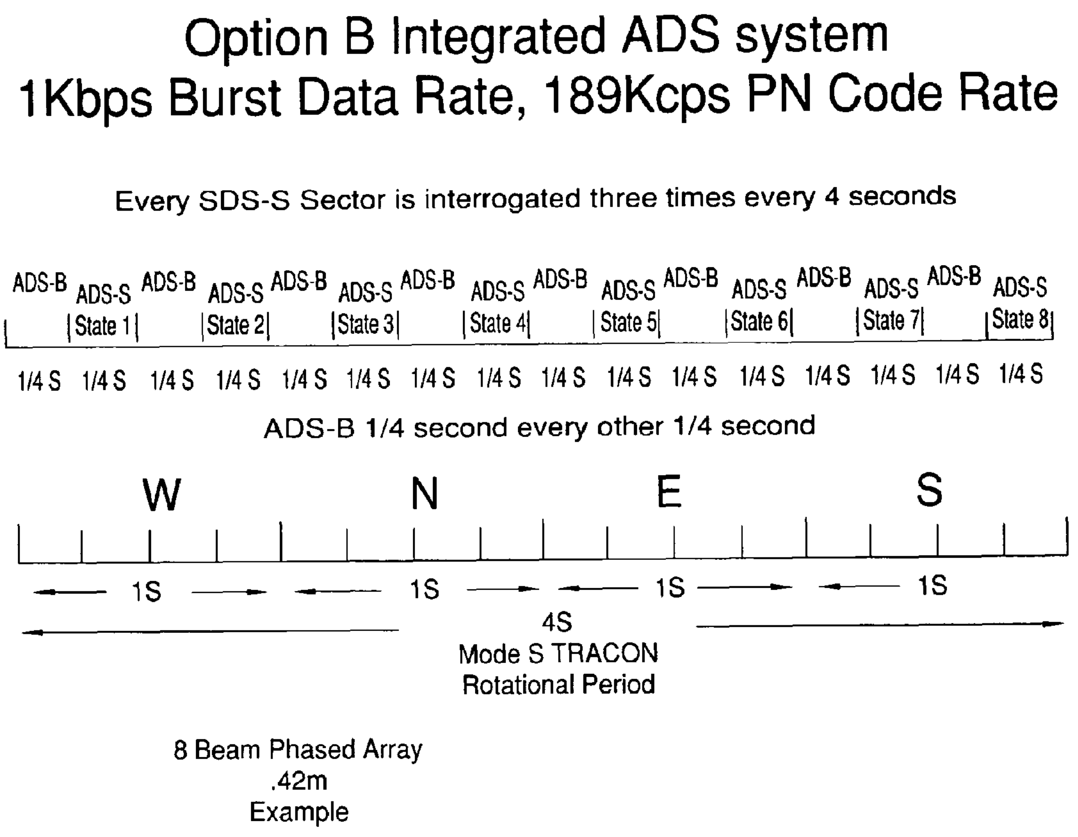
FIG. 19 illustrates, for Option B, how ADS-B Enroute, ADS-S TRACON and Mode S/ATCRBS use space and time to provide operations in a non-interfering manner for a 1 Kbps burst data rate and a 189 kcps PN code rate per FDMA frequency channel.

FIG. 19 and FIG. 20 describe how the use of time and spatial diversity allow the three surveillance systems to utilize the same spectrum without causing interference to one another for the case of 15 FDMA channels, an 189 Kcps PN code and a 1 Kbps data burst rate in each FDMA channel. This is described for an 8 phased array antenna capable of generating 8 beams, three at a time. The design requires all systems to be synchronized to WASS/GPS time. As shown in FIG. 19, ADS-transmissions are interleaved with ADS-B transmissions. The Enroute ADS-B is time interleaved with TRACON ADS-S transmissions. The ADS-B squitters can occur every other ¼ second.

Within the TRACON, a Mode S/ATCRBS antenna mechanically rotates a 2° beam through 360° every 4 seconds. The ADS-S system utilizes a phased array antenna with 8 primary beams. As shown in FIG. 20, the rotation of the mechanical antenna is synchronized with the 8 states of the ADS-S antenna. For each state, the ADS-S forms a minimum one 45° transmit beam and three 45° receive beams. The beams are at least 67.5° degrees separated from the mechanically rotating beam and 90° from each other. The period of an ADS-S state is ¼ second and each TRACON spatial area is visited 3 times every 4 seconds.

The ADS-S transmits in three sectors, sequentially but very rapidly, at the start of a ¼ second interval. No more than 15 users per sector are interrogated at any one time. The system can support transmission of 360 150 bit messages every 4 seconds. This capability can be utilized several different ways. For example, the set of transmissions can be partitioned so that two 150 bit message replies (300 bit message) will come from 90 aircraft and 150 bit message from another 180 users within a 4 second cycle period.

The 3 systems are synchronized so that mutual interference is not created. To achieve this synchronization WAAS/GPS timing is used in all ground and air terminals. WAAS/GPS, as discussed earlier, provides relative timing down to the nano second level.

Figure 21:
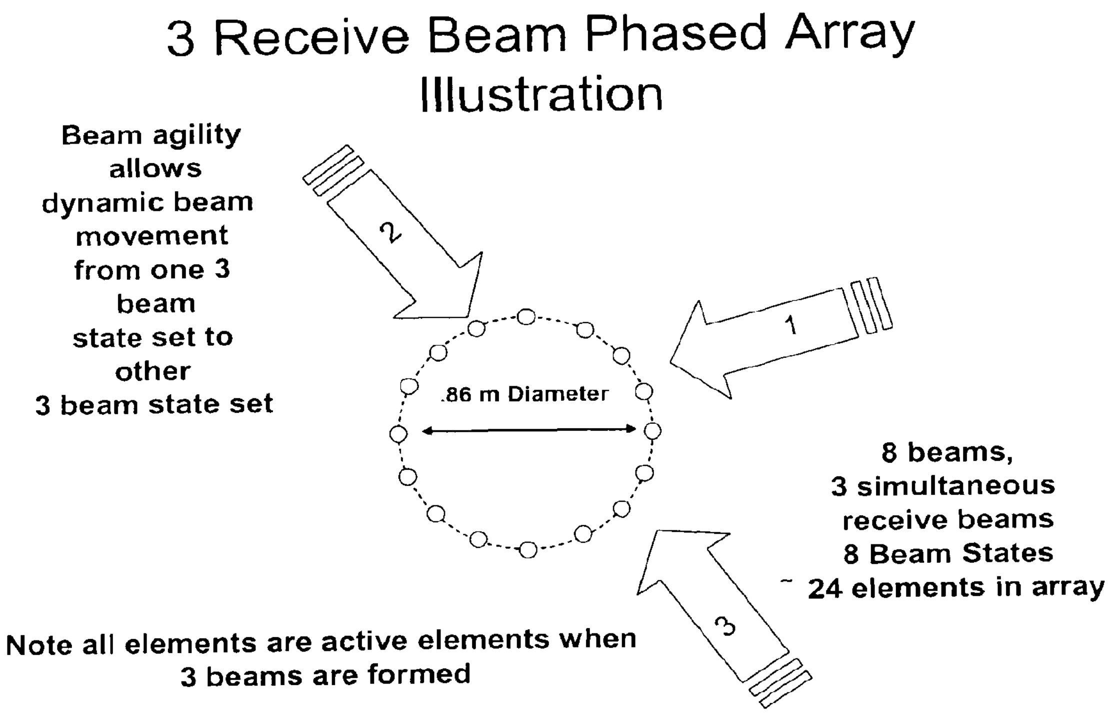
FIG. 21 illustrates a phased array antenna capable of forming 3 receive beams.

The phased array antenna used by Option B to increase capacity and prevent interference with other surveillance systems, is illustrated in FIG. 21. As shown it is 0.86 meters in diameter and utilizes approximately 24 elements to form all required beams. Note that the 8 sectored antenna is used to describe performance for Option B. The trade space between antenna, gain, bandwidth and degree of protection against a saboteur is discussed later.

Selection of PN Code Set to Prevent Unauthorized PN Code Ranging

Numerous code sets exist. The criteria are for a very, very long code period. The code or codes do not have to be orthogonal to one another since there is only one user per FDMA channel. Thus if the code is very long, one code may be used with each FDMA channel transmitting the code at very different start times. Thus if the code cycle is years long the code starts are essentially independent of one another.

The code selected is a variation of the GPS P code set. The GPS P-codes are generated by four 12 stage maximal length shift registers. Each generator can produce a code period of 4095 chips. The codes are paired and each pair's product produces a code period in the vicinity of $1.6\times10^{7}$. The product pairs are a little short cycled (15345000 & 15345037). Note they differ by 37 chips. Finally the 2 pairs are once again multiplied so that the period for the resultant code is 38 weeks. The 37 chip difference is used to generate 37 different pseudorandom codes.

Figure 22:
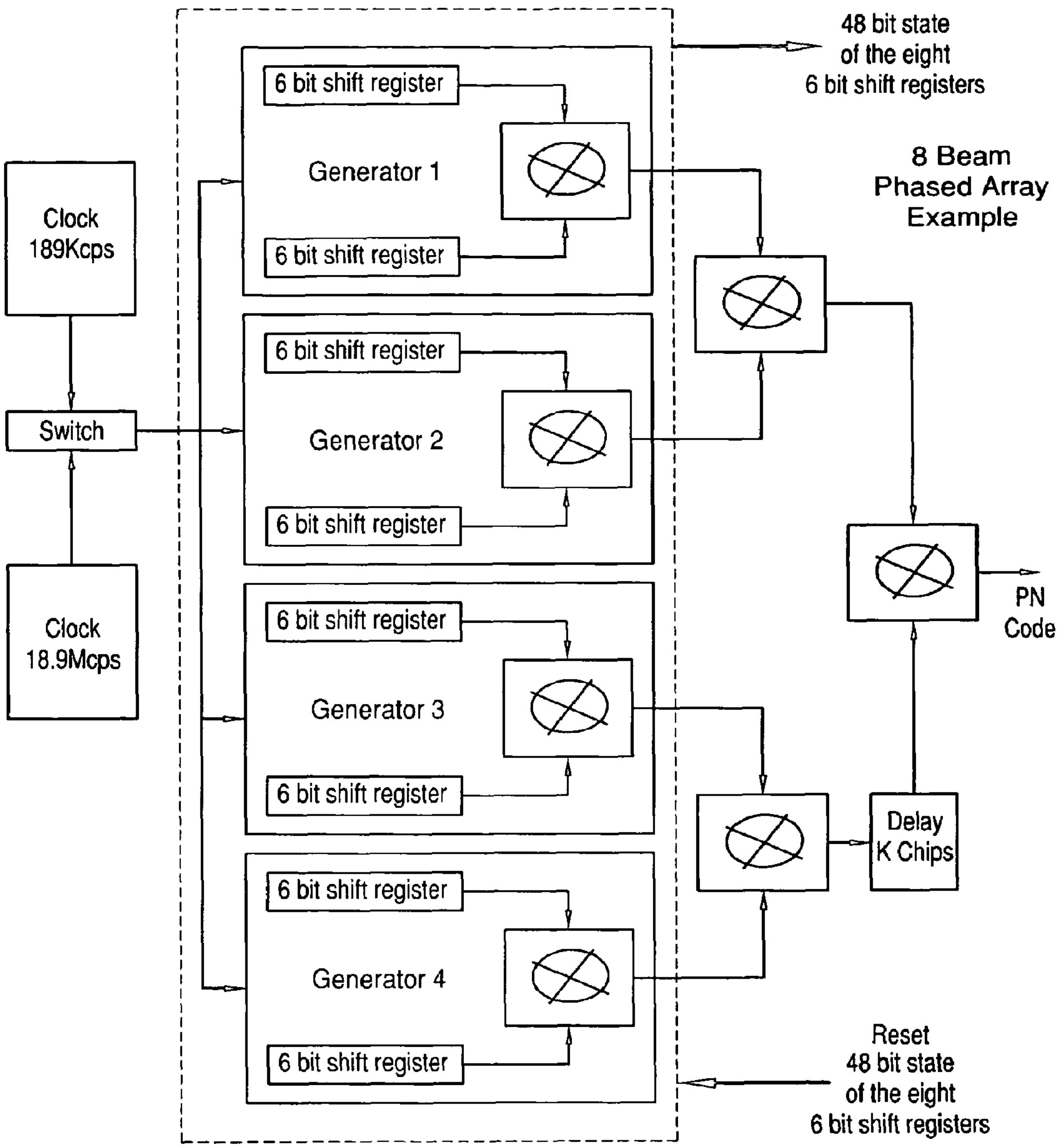
FIG. 22 illustrates the ground terminal PN code generator for Option B.

As described in FIG. 22, the ADS-S code is based on a 6 stage maximal length shift register. The code generator utilizes 8 such registers to generate three levels of product pairs. The resultant code length is given in FIG. 23. As can be seen the code length is $2.48\times10^{14}$ chips. This is slightly longer than the GPS P code ($2.354\times10^{14}$ chips). When clocked at the Option B clock rate of 189 Kcps the code cycle is 2,170 weeks.

As can be seen there are three levels of products. The first level forms 4 products by pairing the 8 registers and forming 4 product outputs. The product outputs are paired once more so that their product output generate two codes which are again paired with the final product generating the ADS-S code. As with the GPS P code, the codes can have slightly different periods so that if one coded is delayed k chips a second ADS-S code is generated. This is an option that can be used to further make the unauthorized users search more difficult. Thus one can select for a given user, every 4 seconds, one of 15 frequency channels, a PN code and the start time for that code. This could lead to a trillion possibilities for the few codes that are changed every four seconds.

As shown in FIG. 22 and FIG. 23, an 18.9 Mcps clock can be used to run through the entire code in less than 22 weeks. For each chip of the code cycle there is a unique state setting of the 8 shift registers which is represented by 48 bits that generate that chip. As shown, in FIG. 20 the states of the code generator are outputted for either immediate transmission to an aircraft or for future start of a coded message. As shown, this is but one generator in the ground terminal. There are 360 messages transmitted every 4 seconds. Creating the generators is easy so that many can be utilized to randomize the PN code per user per message. Note that at least 45 code generators are required to support one of the eight states of the beam formed antenna that are generated each quarter of a second. A ground terminal with 1000 such generators or more is not unreasonable. This is true if only one code is generated since the start times of each code are essentially independent of each other. Also shown in FIG. 22 is an 18.9 Mcps clock which can run through the code and record at random different states of the code over an 8.8 week period. These states can be recorded and selected at random for a given start time of a given PN message. The two clocks are shown sharing the same code generator with the high rate clock running and generating states that are used later. A better solution is to give the higher rate clock its own generator to run and record states spanning the entire cycle. A library of code start states is then kept and each generator using the same code randomly selects a code start state. This state is then transmitted to the aircraft for the next aircraft PN code protected ADS-S message.

Figure 24:
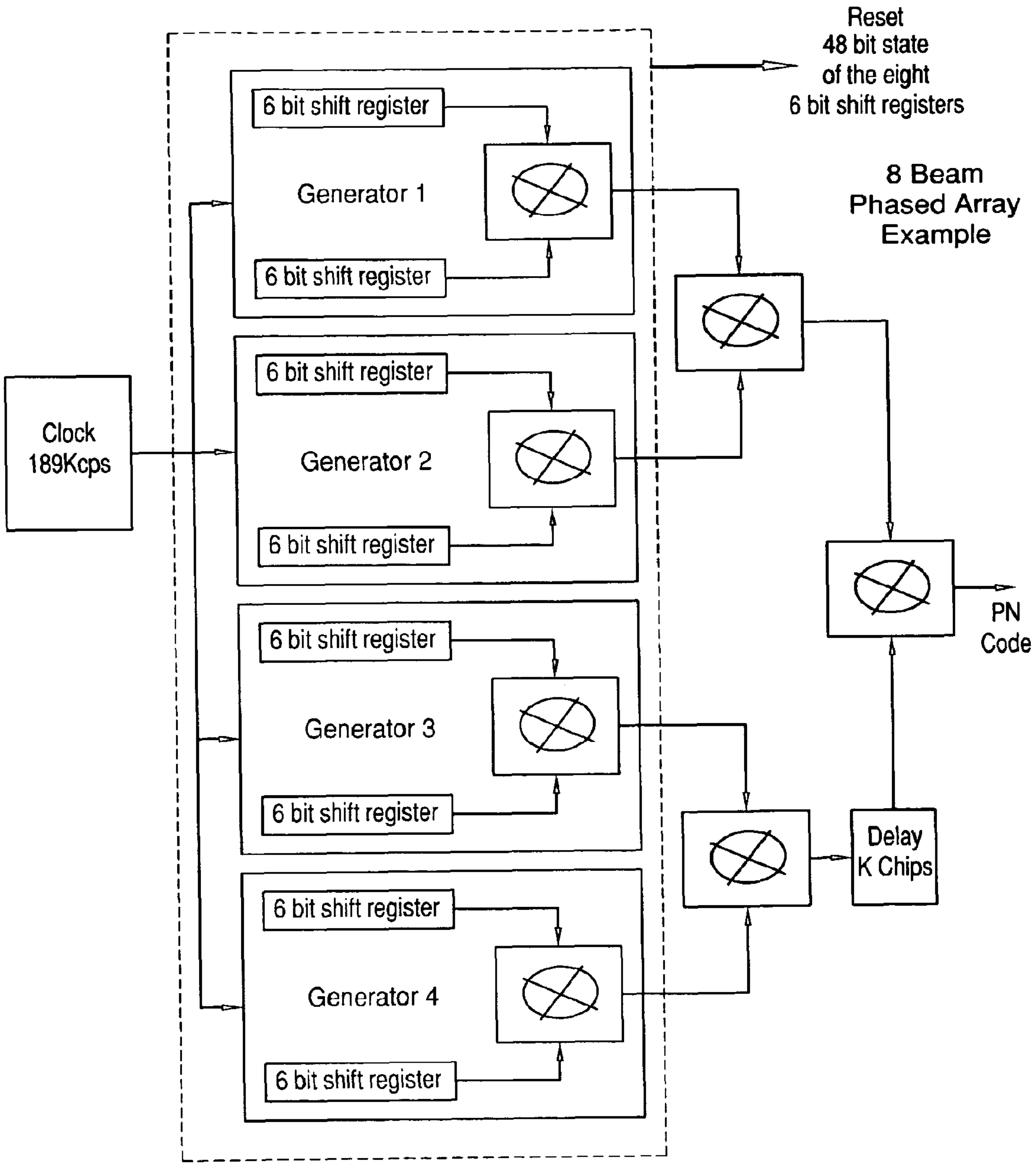
FIG. 24 illustrates the aircraft radio PN generator for Option B.

FIG. 24 describes the aircraft PN code generator. As shown it is identical to the ground terminal code generator except less complicated. A message received from the ground provides the 48 bit code state vector which is used to restart the code generator on its next ADS-S reply. The code generator is a PN code which runs at 189 Kcps and spreads modulated and encrypted data message in one of 15 frequency channels.

Generating High Ground to Air Data Rates

Figure 25:
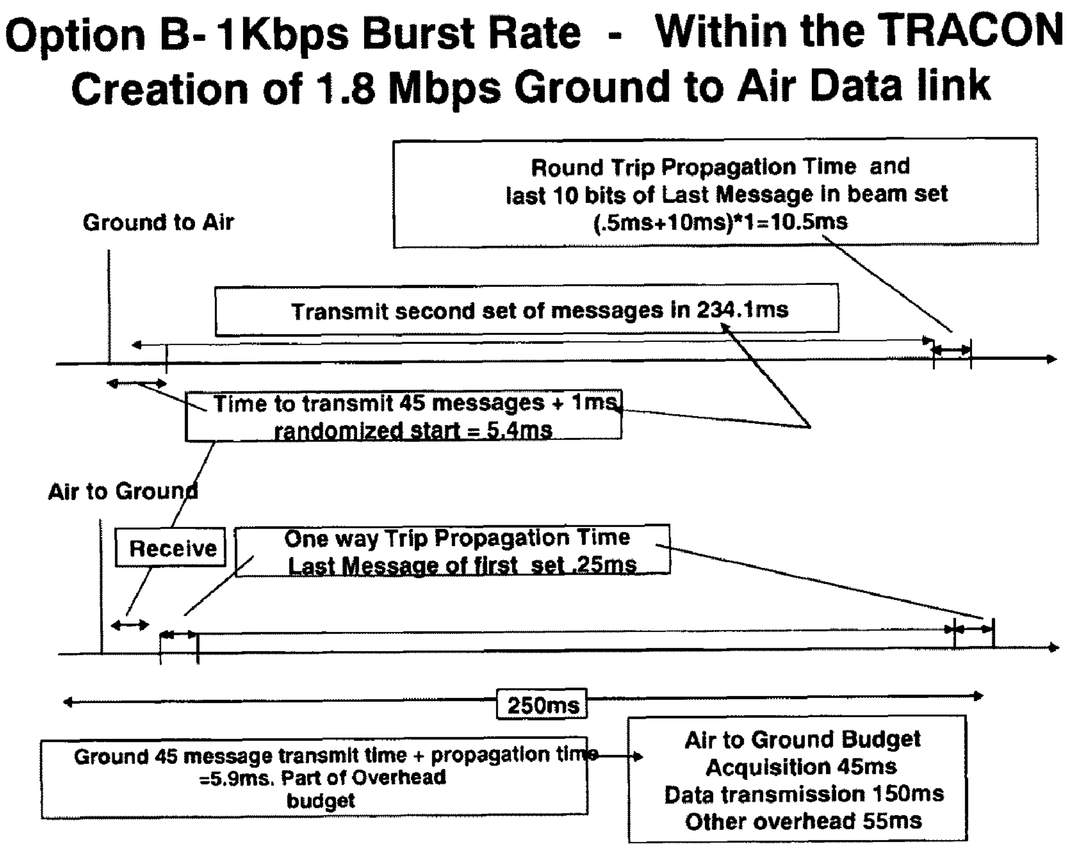
FIG. 25 illustrates the time line for an ADS-S transmission set and the response set for a 1 Kbps burst rate.

A 55% overhead factor is assumed. FIG. 25 presents a time line for ground to air and air to ground transmissions, for a 1 Kbps burst data rate and a 189 Kcps PN code rate, which lasts a ¼ second. The transmission of the 100 messages together with the lms random replies start time takes only 8.5 ms.

The down link contains 150 bits per message. The last 10 bits are used for information requests and to acknowledge reception of a second message. Thus the single message reply is so long that it can be used for both the ADS-S reply and for receipt of a second message and the acknowledgement of its receipt (small messages can also originate in the aircraft).

Accounting for round trip propagation time and the last message of the sets 10 bit acknowledgement of a second message leaves over 234 ms that can be used for uplink transmission of messages to aircraft in the three beams that are activated The round trip delay is part of the 55% overhead so a 8 Mbps burst rate, which is on 45% of the time thus yielding a 1.8 Mbps data rate. If two beams were used to transmit the data rate would double and if all three beams were transmit activated the total data rate would triple to 6.6 Mbps.

Hiding the ADS-S Message—The Second Element

The process of generating and using PN codes just discussed does not allow the saboteur to know the code. However if the signal is above the noise level then by squaring the signal a range measurement can be made. To place the signal below the noise is a function of the placement of the saboteurs terminal, the TRACON antenna gain, the data burst rate and the PN chip rate which is related to the number of users in a beam and the total allocated air to ground bandwidth.

To start the investigation, FIG. 26 describes the aircraft model for aircraft altitude as a function of distance from the airport runway that will be used. The model assumes that an aircraft at 50 m from the runway is at an altitude of 15,000 feet or higher and that the lowest aircraft altitude at a given distance from the runway decreases by 3000 feet every 10 miles.

The worst case is for the saboteur to have a terminal directly below the aircraft as it passes by. FIG. 27 provides the comparative link budgets for the aircraft terminal and the saboteur who is located directly below the aircraft at 50 m from the runway. As shown the terminal has a positive C/N ratio at that point. As the aircraft descends to beyond 30 nm or lower the saboteur distance from the plane increases and the C/N is negative.

FIG. 28 provides the link budgets for a set of worst case saboteur terminal placements, namely the saboteur having a terminal at 50, 40, & 30 miles from the runway and seeing the aircraft directly overhead. It is clear that a 0.86 m diameter phased array antenna does not have enough gain to sufficiently lower the controlled aircraft power to a lower enough level that the saboteur cannot see it. However a 1.72 meter diameter 32 beam phased array does result in the air craft's ADS-S reply having its controlled power reduced so that even in the worst cases the saboteurs received C/N ratio is negative. This is achieved by using a phased array antenna that generates 32 beams (where each beam is 11.74°), 14 at a time, and increasing the chip rate to 756 Kcps. This creates the potential of providing 336 aircraft ADS-S reply messages every 4 seconds. The number of messages in a single beam on average is 11 messages every 4 seconds. Note that air traffic in the TRACON will not be uniformly distributed.

ADS-S Option C

Option C utilizes the DME 980 MHz to 1010 MHz band. The question is why?

This part of the band is allocated to DME replies from the ground. If ADS-B is used in the Enroute area and ADS-S in the TRACON, then there is no need for DME.

The 1030 Mode S interrogation, as discussed when describing Option B, does note interfere with ADS-S 1030 interrogations. Placing the return in another bandwidth thus has the following major advantage. The terrorist threat is reduced. In addition the ADS-B squitter rate returns to once per second in the Enroute center and is not synchronized with ADS-S and the ground to air data link capacity increases.

To start with the use of option C allows the burst data rate to be halved since the 8 sectored state can be twice as long as in Option B, since time does not have to be shared with Enroute ADS-B so that ADS-S can be on twice as long. This is shown in FIG. 29 where for the same bandwidth as in Option B, the data rate is lowered by a factor of two for the same ADS-S message rate and the same number of bits per message as in Option B. with the result that power is reduced by 3 dB which lowers the saboteurs C/N ratio by 3 dB. For all alternative Option C designs the data burst rate is held to 0.5 Kbps.

Five alternative designs are presented in FIG. 29. The first keeps the bandwidth at 6 MHz and by reducing the data rate achieves a 3 dB improvement against the saboteur. The second option increases the bandwidth to 12 MHz. This allows C/N ratio to decrease further by 3 dB. The third option uses 12 MHz to increase the messages sent while the fourth option increases the bandwidth to 24 Mhz to decrease the C/N that the sabatuer sees as compared with option 3. Finally option 5 returns to a 0.86 m antenna and uses the extra bandwidth to reduce the C/N value to a negative number while still being able to transmit 360 messages every 4 seconds.

When operating with an Option C design as compared to an Option B design, the major difference is that the clock rate doubles each time the channel bandwidth doubles and the PN chip rate doubles.

In summary, if additional bandwidth can be obtained, there are significant advantages that can be exploited to counter the most sophisticated of saboteurs.

Aircraft Terminal

A new aircraft surveillance terminal needs to be designed, built and distributed.

Figure 30:
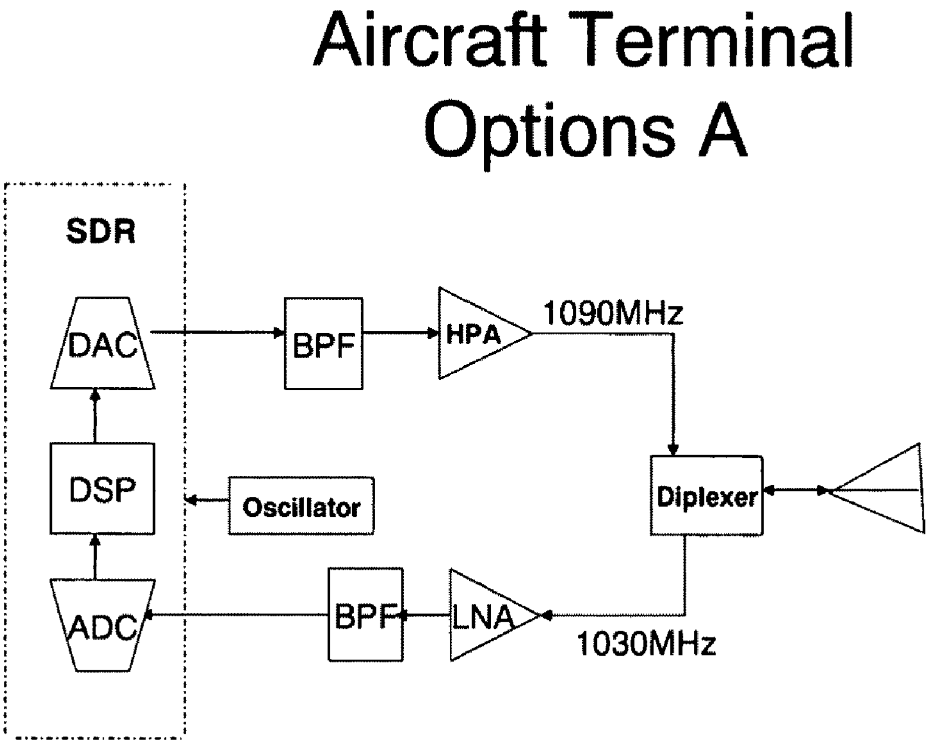
FIG. 30 provides a high level block diagram of the aircraft terminal for Option A, assuming a software defined radio (SDR) implementation.

FIG. 30 describes the aircraft terminal for Option A. As shown in this example, the terminal is implemented using a software defined radio.

Received 1030 MHZ signals pass through a low noise amplifier followed by a band pass filter and then enter a software defined radio comprised of an analogue to digital converter (ADC), a digital signal processor and a digital to analogue converter (DAC). The analogue signal is filtered, amplified and then transmitted at 1090 MHZ. This is the process, whether the signal is Mode S/ATCRBS, BCAS or ADS-S. The received signal from the ground occupies a BW of 8 MHz which is similar to Mode S. The amplifier is the same for all three systems. The ADS-S messages require digitally incorporating a decryption, encryption processor.

Figure 31:
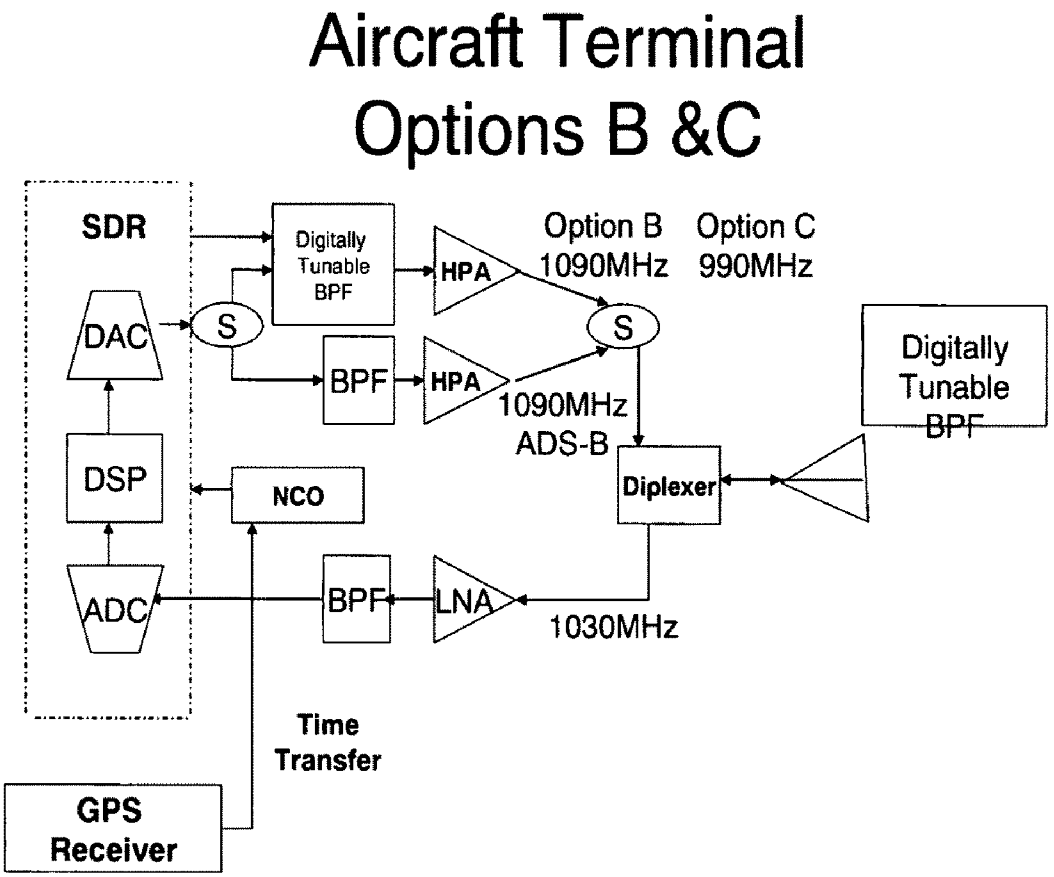
FIG. 31 provides a high level block diagram of the air terminal for Options B & C, assuming a software defined radio (SDR) implementation.

FIG. 31 describes the aircraft terminal for Options B & C. When compared with Option A it can be seen that it is a more complex terminal. After the ADC operation on the received signal, the processor has to configure signals for replying to the three surveillance systems. This requires the added function of PN spreading. Timing is derived from GPS so that a timing interface exists between the GPS receiver and the SDR. Once the signal is converted to analogue, a switch exists to select the correct HPA for the signal being transmitted. In the case of a ADS-B or Mode S/ATCRBS signal, a high powered peak average and very low average power HPA is required. In the case of an ADS-B or C transmitted signal a tunable digitally controlled filter is tuned to the correct FDMA channel and transmitted via a very low, power controlled, average power HPA.

Most of the radio functions are performed digitally within the digital signal processor. These functional sets of operations are performed at a given time and in a particular airspace and therefore receives messages only from the system that provides surveillance support in that airspace and transmits formatted replies for that same system. The key functions performed by the DSP are described in FIG. 32. It can be seen that most of the functions, for the three systems are the same, however they will differ in there implementation. Clearly the functions of FDMA channel selection, encryption and PN code spreading are unique to ADS-S systems. The advantage of using the SDR is that each function can be reconfigured for each system within the same digital chip set. The complexity is in the software which has to support encryption/decryption and dynamic generation of PN codes.

Tracon Ground Terminal Option A

The TRACON ground terminal for Option A is assumed to be a Mode S/ATCRBS TRACON terminal. As such the unique functionality is related to DSP functions of which the key is encryption and decryption. The encryption scrambler and the decryption unscrambler have been discussed and described in FIG. 12 through FIG. 15. Further ground terminal discussion of these functions is given in the description of the Option B&C ground terminal. If a independent multi beam phased array is used, then additional functionality has to be added. Such an implementation is described for Options B and C, where it is required.

OPTION B & C

Figure 33:
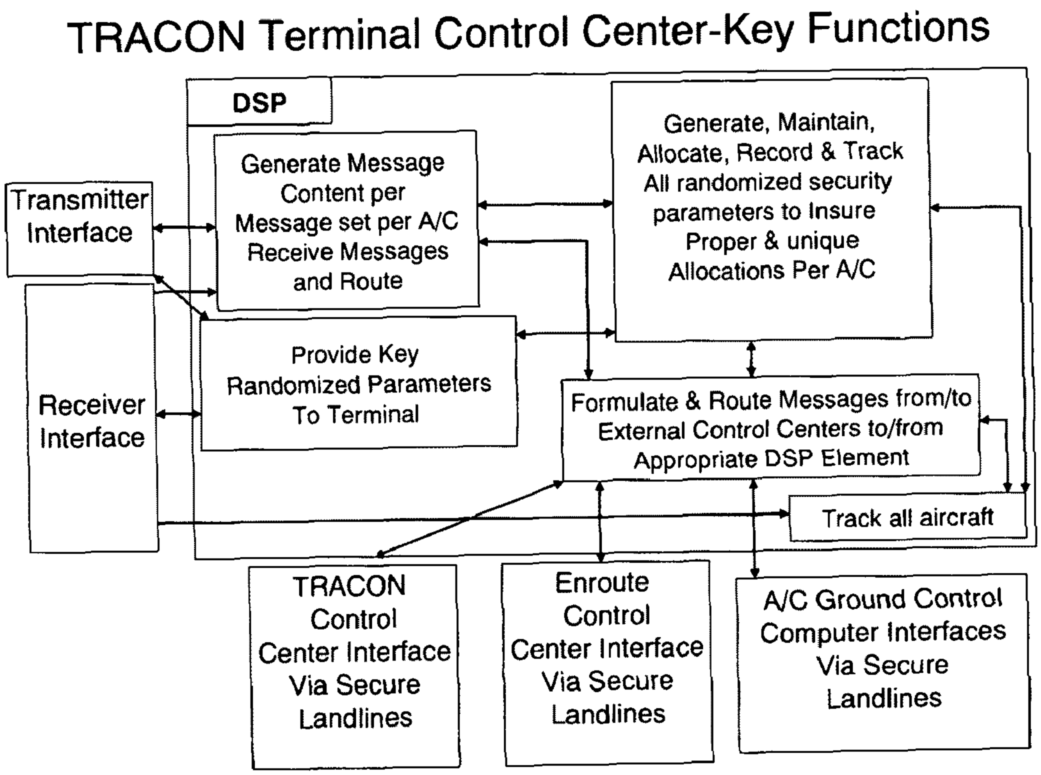
FIG. 33 provides a high level diagram of the TRACON ground terminal control center.

The ground terminal is comprised of three elements, namely the terminal controller, the transmitter and the receiver. The terminal controller is described in FIG. 33. As seen. the terminal controller is implemented digitally and has the following major terminal interface functions namely;

1. to provide the transmitter the message content per aircraft
2. to provide the transmitter the unique encryption setting per aircraft,
3. to provide the receiver the frequency assignment per aircraft per beam, receiver decryption setting per aircraft, the estimated time of arrival per aircraft message and the PN code per aircraft.
4. to route messages received from aircraft to the appropriate elements within the TRACON terminal DSP.

The terminal controller also has interfaces with the TRACON Control Center, the Enroute Control Center and, if implemented, the set of A/C ground control computers.

To properly provide these interface functions, all aircraft in the TRACON have to be tracked. A library has to be kept which allocates and tracks PN codes, encryption codes, message reply start times, frequency assignments and power control levels per aircraft and per beam. To support the Library functions PN code generators, as described in FIG. 22 is used with a fast clock so that PN code states can be generated per code quickly and recorded in the Library so that codes can be independently and randomly assigned. Other digital tools necessary to generate and record random states for encryption codes, random start times for aircraft replies and frequency assignments are used by the Library.

Messages received from external control centers have to be routed to the proper DSP element. Such messages include ATC messages to aircraft and notification of aircraft transitioning from the Enroute airspace to the TRACON and aircraft leaving the terminal. Messages to the external control centers include message replies of aircraft tracks and notifications of aircraft leaving the TRACON or entering the terminal.

There is at least one message per aircraft per beam state. However there is, nearly all the time, the possibility of two messages transmitted to each aircraft per beam state. The first message always provides the ADS request update. The Messaging element of the DSP is provided the aircraft randomized reply start time, encryption/decryption and PN code states and other key parameters from the library and ATC messages from the External Control Interface from which it allocates message content to the first or second message. If the data message content is greater than can be transmitted for that given state, then message content is selected based on priority. Message type prioritization is set apriori within the DSP by priority categories. Thus a weather update has less priority then a collision avoidance message.

Received messages content is appropriately routed to the tracker, the Library and to the External Control Center Interface elements of the DSP.

The key functions of the Terminal Control Center are presented in greater detail in FIG. 34, FIG. 35 & FIG. 36.

Figure 37:
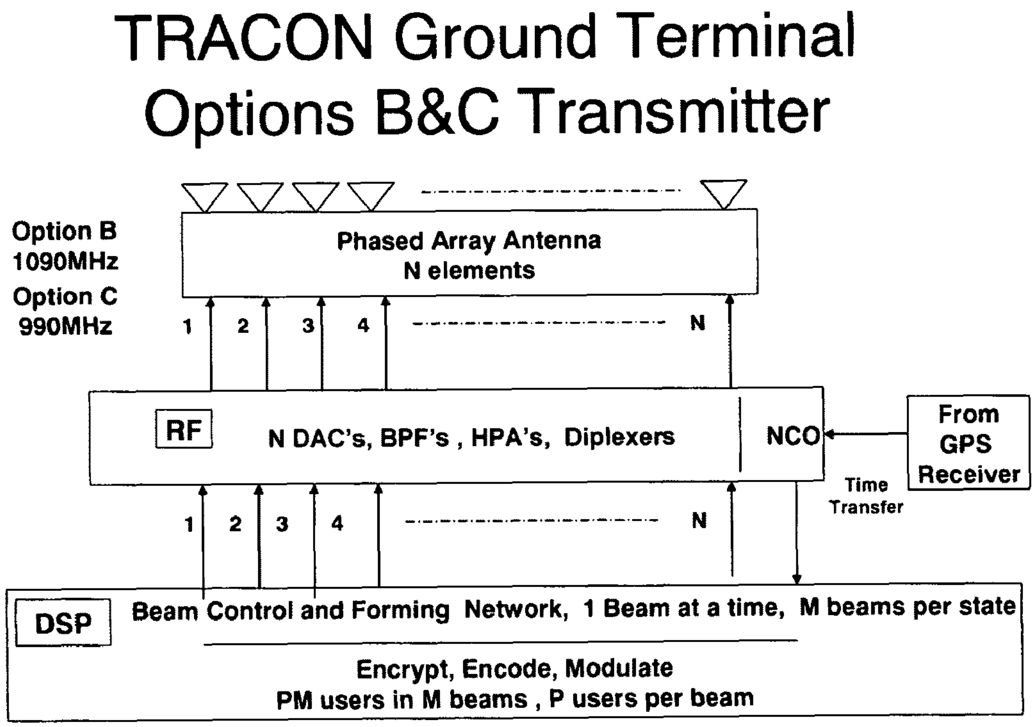
FIG. 37 provides a high level block diagram of the ground terminal transmitter for Options B & C, assuming software defined radio (SDR) technology is utilized in the implementation.

The ground terminal transmitter is described in FIG. 37. The terminal takes messages from the ATC control center, sorts them with respect to the beam the aircraft are located in and arranges each beam set in a sequential manner. Each message is then formatted, encrypted, encoded, modulated and passed on to the beam control and beam forming network. The encryption scrambler, which is implemented in a similar manner to the decryption descrambler, has been described earlier in FIG. 12, FIG. 13 and FIG. 14.

The beam controller selects the correct beam and the beam network then creates N replicas of the signal with each differing in phase so that each phased array antenna element will be properly phased with the result that the correct beam for that message set is formed. Each of the N phased messages is then D to A converted. This operation is performed in parallel for all N messages and each is then filtered, amplified and passed to the proper phased array element. This process is rapidly and sequentially repeated for all messages sent to the A/C in that beam. The process is then repeated for the next set of users in the same multi beam state until all beams in the state are covered. Once this is complete, second messages can be sent sequentially to these same aircraft within the receive message period defined by the aircraft burst rate. The entire process is then repeated and sequenced through all beam states. As soon as every beam has been visited the same number of times, a multibeam state cycle is declared complete and the next cycle is started.

Figure 38:
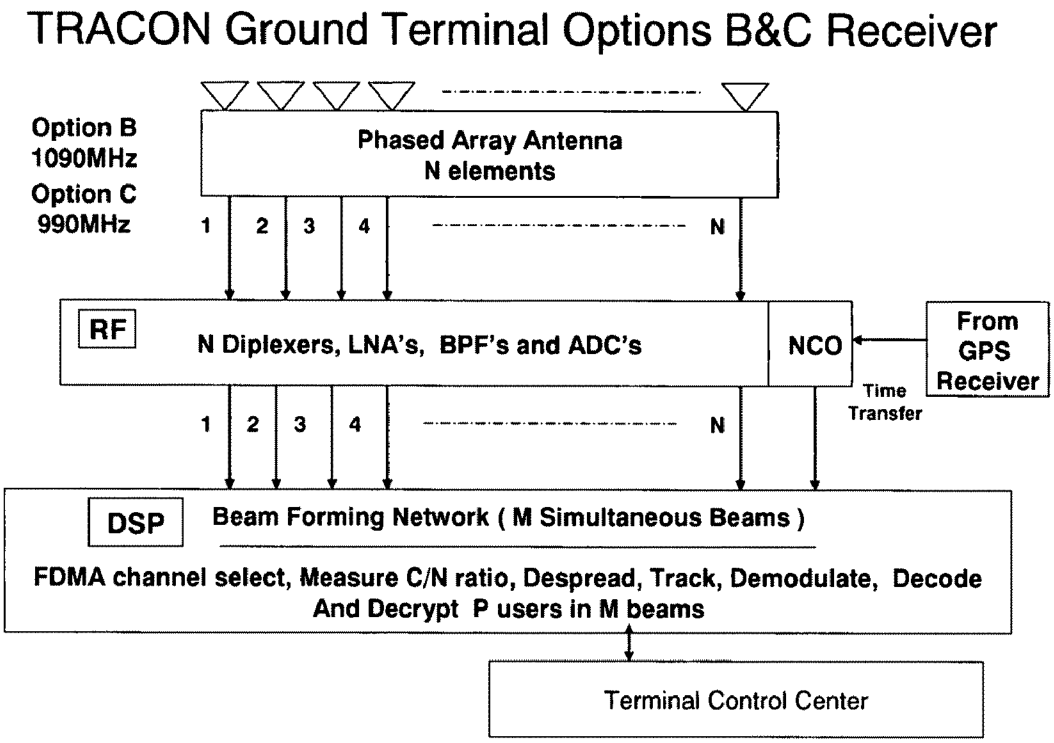
FIG. 38 provides a high level block diagram of the ground terminal receiver for Options B & C, assuming software defined radio (SDR) technology is utilized in the implementation.

The TRACON ground terminal receives up to P users located in M beams that have been simultaneously formed to capture all replies within the beam forming state. The receiver is described in FIG. 38. The receiver knows which beams to form simultaneously from the set of messages transmitted to the aircraft for that multi beam state. The N received signals, from the N antenna elements are each amplified, filtered and past through a DAC. The partitioning of the P users per beam, for each of the M beams is created by digitally passing each set of signals, for each received antenna element through M filters whose output is phased so that when combined with the proper N−1 phased elements a beam filter is generated through which P FDMA signals for that beam pass through. The phasing essentially provides the spatial separation. This process occurs in parallel for all M beams that are in the multibeam state and which are spatially separated.

The signals within a beam are then each frequency filtered and digitally processed for PN code acquisition and tracking, demodulation, decryption and data extraction. The measurement of carrier to noise power ratio is performed digitally and indirectly by measuring the carrier to noise density power in the data bandwidth and extrapolating this to the PN bandwidth. This ratio, together with the rate of change of C/N is used to support the power control function.

Most of the radio functions are performed digitally within the digital signal processor. The key functional sets of operations performed by the DSP are described in FIG. 39. The ground terminal functionality is given only for ADS-S since in the TRACON it is the only set of functions performed by the TRACON ground terminal for options B &C. In Option A the preferred implementation is to use the Mode S/ATCRBS terminal as discussed earlier. In that case nearly all the same functions, described in FIG. 39 will have to be incorporated into the digital terminal processor. As shown, Option A functionality is simpler since PN code functionality does not have to be performed and state change is not really as major an issue. Although most of the functionality is the same for ADS-S Option A, as compared to ADS-S Options B & C, there implementation is significantly different. All ADS-S Option A functions are performed in a sequential manner, while for Options B&C all receive functions are carried out in parallel for M beams of a multi beam state and for all MP users in the state.

Secure ADS-S Backup Options within Tracon Airspace

If ADS is not working because of some GPS/WAAS malfunction, all options for a backup system can be described as ADS-S derivates and therefore provide a secure system backup There are three basic categories for an ADS-S backup. The first uses a navigation backup system such as LORAN. The second uses the ADS-S ground terminal to perform range and bearing measurements and obtains altitude in the ADS reply message. The third uses multilateration techniques to determine three dimensional positions, of aircraft, from range measurements. The decision as to which technique should be used as the surveillance backup system is a function of many variables. This just demonstrates that which ever is chosen, a secure surveillance backup system can be achieved as a derivative of ADS-S.

Figure 40:
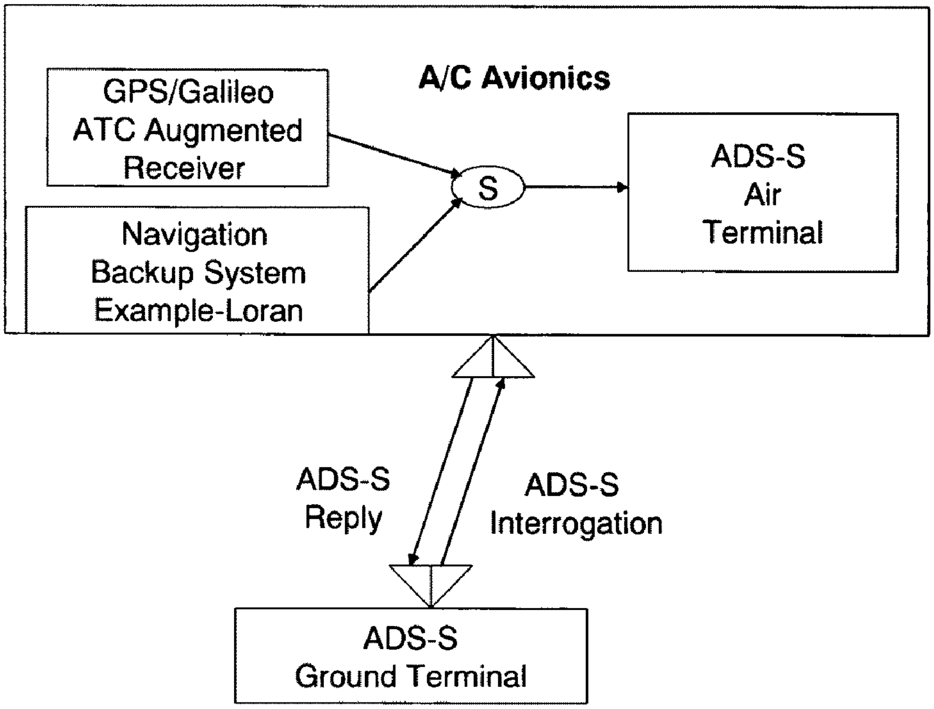
FIG. 40 illustrates how a navigation backup system can be used as an ADS-S backup system.

FIG. 40 presents the first option in which a backup navigation system is used. In this case there is essentially no difference in the ADS-S process. The aircraft is interrogated via an ADS-S format and the reply rules are the same except the other navigation system is switched in for the augmented GPS/Galileo system.

Figure 41:
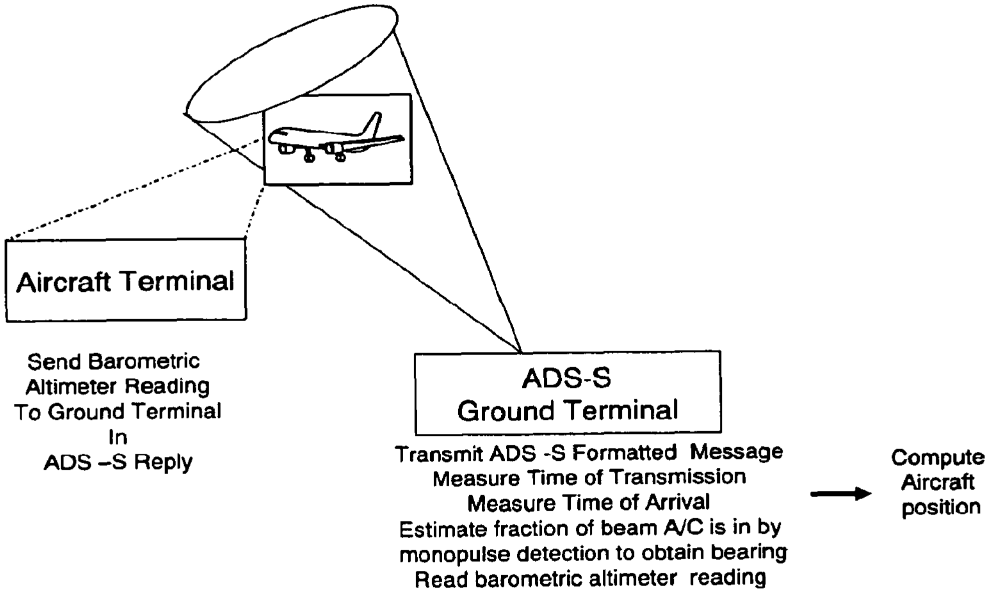
FIG. 41 illustrates how an ADS-S ground terminal can provide a secure surveillance backup to ADS-S.

FIG. 41 illustrates the second option MODE S-S which is a natural extension of ADS-S since the transmission to the aircraft need not change. The return signal need not change except the encoding altimeter altitude is added to the return message. An ADS-S formatted message with all aspects of the normal ADS-S message included. The terminal measures the time of transmission and the return message PN code is used to correlate with and determine the time of arrival. This provides a two-way range estimate. The terminal performs a monopulse detection monopulse detection which allows an angle measurement to 1/30th to 1/50th of the beam width. Thus MODE S-S determines position as MODE S does, but in this case the position information and aircraft identity are protected. Note however that the bearing estimate is a function of beamwidth. The narrower the beam the more accurate the bearing estimate. If a 32 beam phased array is used Mode S will be over 5 times more accurate in bearing. This option is the least cost option to implement.

Figure 42:
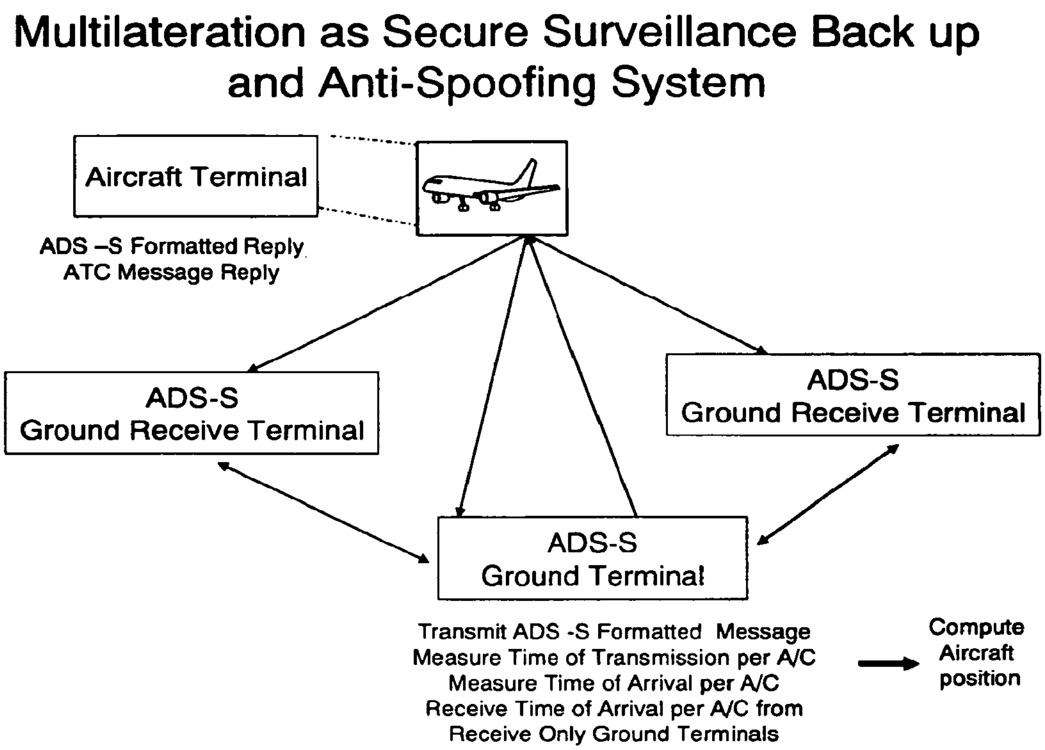
FIG. 42 illustrates how a multilateration system, using the ADS-S signal structure, can provide a surveillance backup system to ADS-S.

The third option is multilateration and is described in FIG. 42. As shown, only a minimum of three terminals is required. If the ADS-S ground terminal is used to multilaterate than only 2 additional terminals are needed to obtain a three-dimensional position estimate of the aircraft. This is due to the fact each measurement is essentially a two-way measurement since you know when the transmission is made from the ground terminal. The other two ground receive terminals use the same ATC augmented GPS and/or Galileo (and/or equivalent satellite navigation system) time referenced system. Therefore, given time and three measurements a three dimensional position estimate of the aircraft's position can be made. If the time uncertainty cannot be resolved to sufficient accuracy a fourth terminal can be added to improve accuracy. Note that the receive only terminals needed to use the same receiver phased array as the ADS-S ground terminal and needs to be synchronized in time and antenna state with the ADS-S ground terminal.

Neutralizing Spoofing

There is a concern that with an ADS system a terrorist, in an aircraft, can transmit an ADS message with an incorrect position. To neutralize this threat and if multilateration is used as the surveillance backup, then if the same terminals are used to measure position all of the time, then an anti spoofing system is created. The ATC system can then compare the ADS aircraft position with that derived from multilateration. The two should always correlate unless an attempted spoofing occurs. This secure anti spoofing system is named ML-S. Clearly this system can be expanded to the Enroute airspace by ranging on BCAS squittcrs.

Automatic Dependent Navigation—Secure (ADN-S)

Figure 43:
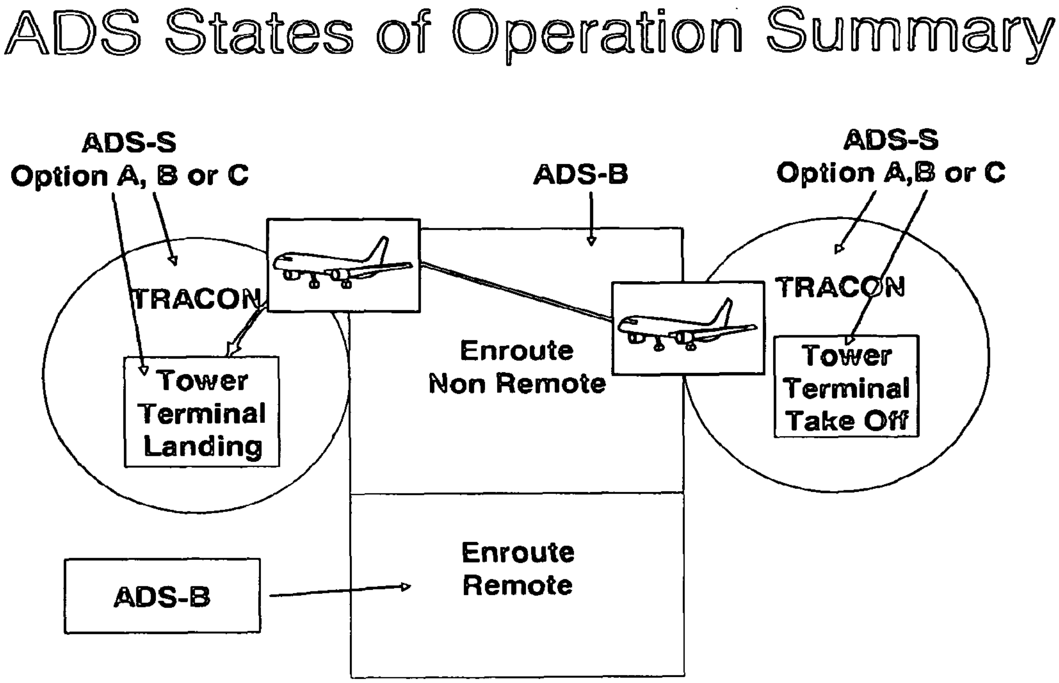
FIG. 43 provides a diagram which illustrates the ADS states of operation for the three options and as a function of ATC airspace.

Using a Mode S like surveillance back up or a multilateration surveillance backup can provide a dependent navigation backup as well. That is, the independent surveillance backup system positions of aircraft measured and calculated on the ground can be up linked via ADS-S messages to each aircraft for their navigation use should both GPS and Galileo (and/or equivalent satellite navigation system) not be functioning Summary Three sets of ADS-S implementation options have been presented. They are designed to increase security in the TRACON airspace. Enroute and remote Enroute airspace utilize ADS-B (see FIG. 43). All options utilize 1030 MHz for ground to air transmissions. The options differ in their security protection.

Option A provides message security only.

Option B provides message security and unauthorized multilateration ranging and tracking protection. An antenna that is at least 1.68 meters in diameter is required to insure that the carrier power, as seen by the saboteur terminal is below the noise everywhere in the TRACON. ADS-S Option B operates at the 1090 MHz band for air to ground transmissions which constrains its PN code bandwidth.

Option C provides both message security and unauthorized multilateration ranging and tracking protection. It offers the potential of increasing the PN code bandwidth which decreases the threat of unauthorized multilateration and or increasing the number aircraft messages received per beam, per second. This option requires international approval for reallocating this bandwidth from DME to ADS-S.

Derivatives of ADS-S provide a surveillance backup system. The options for implementation are either use a navigation backup system so that the surveillance system remains dependent or use an independent surveillance system of which there are two options. In this latter case, the navigation system becomes dependent, assuming there is no independent navigation system alternative. In such a case the ADS-S secure message format is used to provide aircraft their position on a regular and frequent basis.

If multilateration is used as the backup system, this independent surveillance system can provide an anti spoofing system also.

While the invention has been described in relation to preferred embodiments of the invention, it will be appreciated that other embodiments, adaptations and modifications of the invention will be apparent to those skilled in the art.

What is claimed is:

1. In an automatic secure dependent surveillance system (ADS-S) for protecting communications between a ground terminal connected to a terminal radar approach control (TRACON) control center and aircraft within an airspace controlled by the TRACON control center, said airspace hereinafter referred to as the TRACON, the improvement wherein:

said ground terminal is an ADS-S radio frequency (RF) ground terminal including an antenna having a data rate capability in the range of megabits per second per beam for respectively transmitting ground-to-air messages and receiving air-to-ground messages between said ground terminal and said aircraft within the TRACON, and said ground terminal is connected to an encryption/decryption processor arranged such that each one of said ground-to-air and air-to-ground messages within the TRACON is individually encrypted by providing a unique code or code state for each aircraft to protect against unauthorized reading of the messages.

2. An ADS-S system according to claim 1, wherein aircraft within the TRACON transmit messages only in response to TRACON ground control ADS-S messages, and wherein the aircraft transmit "automatic dependent surveillance-broadcast" (ADS-B) messages in all other airspace, said ADS-B messages being transmitted by the aircraft in the other airspace to ground control and to all aircraft within a vicinity of the aircraft in the other airspace.

3. The AD S-S system according to claim 2, further comprising a plurality of derivative secure surveillance backup systems of which any one is achieved by:

a) using the ADS-S terminal to perform two way ranging on the ADS-S reply, estimating bearing using monopulse detection, and reading the ADS-S message for the altimetry reading;

b) utilizing a backup navigation system having aircraft reply to a ground interrogation transmitting, via an ADS-S formatted reply, the backup navigation positional information; or c) multilateration on an ADS-S reply to an ADS-S ground interrogation.

4. An ADS-S system according to claim 2, wherein an independent PN spread code is provided for each aircraft to place message signals under a noise floor and eliminate threats from a multilateration system which takes transmissions from aircraft within the TRACON and utilizes it to measure the range from multiple sites by unauthorized users providing them aircraft ranging and tracking information.

5. An ADS-S system according to claim 4, wherein said system ensures that the signal is under the noise floor by utilizing PN code spreading, receiver antenna gain or beam width, and aircraft radio reply power control.

6. An ADS-S system according to claim 4, wherein the system is further adapted to implement said PN codes in an FDMA structure with one aircraft link per FDMA channel.

7. An ADS-S system according to claim 4, wherein the system utilizes a base PN code which has a code chip cycle that is at least as long as the GPS P code chip cycle.

8. An ADS-S system according to claim 7, wherein the system is adapted to generate a sequence of PN code generated binary digits, over a length of the message, whose sequence of binary digits is extracted from the base PN code and whose sequence start time is randomly selected with the base PN code.

9. An ADS-S system according to claim 4, wherein the system further randomizes knowledge of code start time by having the code start time randomized for each air-to-ground link by a random reply time selected within a data bit interval.

10. An ADS-S system according to claim 4, wherein the system adds information bits to each air-to-ground encrypted message, said information bits providing the aircraft with its next PN code generator state.

11. An ADS-S system defined in claim 4, wherein said TRACON control center adds selection of FDMA codes per beam and PN code generation functionality to generate PN code sets, and to demodulate, decode and decrypt all FDMA codes per beam and all beams that are received simultaneously, each said ground terminal being adapted to select PN code states, encryption and decryption scramble and unscramble sequences, and frequency channel assignments.

12. An ADS-S system according to claim 4, wherein an aircraft radio adds to the radio digital signal processor the ability to dynamically update the PN code state and generate PN codes on the transmitted message.

13. An ADS-S system according to claim 4, wherein (a) an aircraft radio that is adapted to support ADS-S, Enroute ADS-B and Mode S/ATCRBS radio has only one analog receive channel for a three-surveillance system, and (b) the RF output has a switch for controlling ADS-S transmissions that require a tuned radio pass band filter and a power controlled amplifier, and ADS-S transmission that require an ADS-B and Mode S/ATCRBS amplifier that includes a digital signal processor to digitally generate PN codes and decrypt and encrypt messages.

14. An ADS-S system according to claim 1, wherein the rate capability is achieved by utilizing an entire allocated bandwidth to generate a near continuous data rate.

15. An ADS-S system according to claim 1, further comprising:

a network of aircraft within the TRACON, each utilizing a multifunctional ADS-S, ADS-B, and Mode S/air traffic control radar beacon system (Mode S/ATCRBS) aircraft terminal and all operating within the same air traffic control L band (ATC L Band) frequency band allocation, wherein said antenna is a multi beam phased array antenna:

wherein said TRACON control center includes a central TRACON control center which controls and manages said network of aircraft; and wherein the ADS-S system further comprises a global positioning system (GPS) clock system to ensure a time synchronization between Enroute ADS-B and ADS-S transmissions and spatial diversity between Mode S/ATCRBS and ADS-S transmissions such that mutual interference is minimized.

16. An ADS-S system according to claim 15 that implements an L beam state from a possible M beam multi beam ADS-S ground antenna, that iterates over all states to cover all M beams an equal number of times and then repeats the cycle so that each aircraft in each beam receives at least one ADS-S encrypted message per cycle, wherein each aircraft receives up to two messages per beam state and wherein an aircraft replies to one or two messages per beam state.

17. The ADS-S system according to claim 15, wherein each aircraft requires individual decryption and encryption codes so that no unauthorized person listening to either the air to ground link or the ground to air link will decode and read the message, thereby preventing terrorists from using the transmitted position information to accurately target aircraft within the TRACON.

18. An ADS-S system as defined in claim 17, wherein the encryption/decryption code scrambles the order of the data bit sequence equal to $2^N$, where N is equal to the message data length or is some integer fraction of the message data length.

19. An ADS-S system according to claim 18, wherein a transmitted ADS-S message of length N utilizing an encrypted code of length M is then decrypted by the receiver in the ground terminal or a receiver on the aircraft by iterating over each set of M decrypted bits until the entire N bit message is unscrambled.

20. An ADS-S system according to claim 19, wherein said TRACON control center transmits, via the ADS-S ground terminal, an air-to-ground individualized encrypted message to each aircraft as frequently as every message, which encrypted message includes information bits providing the aircraft with:

a) its next individual decryption M code bit delay sequence allowing the unscrambling of a message, b) its next individual encryption M bit delay sequence which scrambles the reply message.

21. An ADS-S system according to claim 15, wherein ADS-S secure messages are generated and received, via the ADS-S multi beam ground terminal, by the TRACON control center for improved centralized air traffic control functionality, said ADS-S secure messages including aircraft transmitted GPS positional messages which provide a most accurate GPS aircraft position for separation assurance, metering and spacing and collision avoidance.

22. An ADS-S system according to claim 15, wherein said system is implemented, via the multi beam ADS ground antenna, on a 1030 MHz ground to air link within an 8 MHz bandwidth and on a 1090 MHz air to ground link within a 6 MHz bandwidth, wherein the system minimizes interference between ADS-B Enroute transmissions, Mode S/ATCRBS transmissions and ADS-S transmissions by (a) synchronizing ground terminal and aircraft clocks to spatially separate ADS-S and Mode S transmissions and (b) time interleaving to separate ADS-B transmissions from ADS-S transmissions.

23. An ADS-S system according to claim 15, wherein said TRACON control center utilizes digital implementation functionality to demodulate, decode and decrypt (a) all aircraft messages received per beam, and (b) all beams that are received from aircraft simultaneously, and to transmit (a) all messages that are modulated, coded and encrypted for transmission to aircraft per beam, and (b) all beams that are transmitted simultaneously.

24. An ADS-S system according to claim 15, wherein an aircraft terminal utilizes a digital radio with a common processor to support ADS-S, ADS-B and Modes/ATTCRBS functionality including encryption/decryption.

25. An ADS-S system according to claim 15, which partitions a pilot's ADS computer between a ground element and an airborne element, the ground element receiving all ADS-S messages within the TRACON via the ground multi beam antenna and determining if an aircraft is required to perform a navigation separation assurance, collision avoidance or metering and spacing maneuver, wherein when such a maneuver is determined to be required, a ground computer transmits a secure message via the ADS-S ground terminal that allows the pilot to perform area navigation separation assurance, metering and spacing and collision avoidance.

26. A method of saboteur-proofing an automatic dependent surveillance system, said system utilizing an air traffic control (ATC) augmented global positioning system (GPS), Galileo system, or both a GPS system and a Galileo system, to transmit positional information, said method comprising the steps of imposing an encryption system on ground to air and air to ground messages within TRACON airspace controlled by a TRACON control center; implementing PN codes in an FDMA communication structure with one aircraft link per FDMA channel; and imposing on each aircraft:

a) its next decryption N code bit state, wherein the bit state when utilized unscrambles decrypted message and its correlated encryption state, and scrambles the order of the ADS-S reply messages, b) its next frequency reply channel, c) its next PN code generator restart k bit register state, d) a randomized delay of the reply to within a data bit interval, wherein randomized bits are provided for the four elements of encryption codes, PN codes, reply start time and FDMA channel selection in a dynamic and secure manner, and wherein said TRACON control center controls a power level and each aircraft in an airspace of the TRACON control center transmits its ADS-S signal so that the power level of all ADS-S reply transmissions arrive at the TRACON control center at about the same power level.

* * * * *